US012106736B2

(12) United States Patent
Park et al.

(10) Patent No.: US 12,106,736 B2
(45) Date of Patent: Oct. 1, 2024

(54) DISPLAY DRIVER INTEGRATED CIRCUIT AND METHOD OF OPERATING THE SAME

(71) Applicant: Samsung Electronics Co., Ltd., Suwon-si (KR)

(72) Inventors: Jinyong Park, Hwaseong-si (KR); Hongki Kwon, Seongnam-si (KR); Taewoo Kim, Hwaseong-si (KR); Hyeonsu Park, Seoul (KR); Hyunwook Lim, Seoul (KR); Hojun Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/807,237

(22) Filed: Jun. 16, 2022

(65) Prior Publication Data

US 2023/0137060 A1 May 4, 2023

(30) Foreign Application Priority Data

Nov. 4, 2021 (KR) ........................ 10-2021-0150243

(51) Int. Cl.
*G09G 5/39* (2006.01)
*G09G 3/36* (2006.01)
*G09G 5/393* (2006.01)

(52) U.S. Cl.
CPC ........... *G09G 5/393* (2013.01); *G09G 3/3696* (2013.01); *G09G 2330/021* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 8,390,613 | B2 | 3/2013 | Park et al. |
| 8,958,642 | B2 | 2/2015 | Cho et al. |
| 9,519,325 | B2 | 12/2016 | Byun et al. |
| 9,613,554 | B2 | 4/2017 | Jang et al. |
| 9,979,922 | B2 | 5/2018 | Konishi et al. |
| 10,573,218 | B2 | 2/2020 | Bae et al. |

(Continued)

FOREIGN PATENT DOCUMENTS

| | | | |
|---|---|---|---|
| KR | 101622207 | B1 | 5/2016 |
| KR | 101625910 | B1 | 5/2016 |

(Continued)

*Primary Examiner* — Saptarshi Mazumder
(74) *Attorney, Agent, or Firm* — Myers Bigel, P.A.

(57) ABSTRACT

A display driver integrated circuit includes a frame buffer, a plurality of image processing circuits and an image processing controller. The frame buffer sequentially stores a plurality of frame data received from a host processor. Each of the plurality of frame data includes a plurality of data slices. The image processing circuits perform image signal processing operations, respectively, on ones of the data slices that are included in a respective one of the plurality of frame data and which are sequentially retrieved from the frame buffer. The image processing controller bypasses at least one of the image processing circuits by applying a bypass control signal to the image processing circuits based on a first plurality of data slices included in a first one of the plurality of frame data and a second plurality of data slices included in a second one of the plurality of frame data.

18 Claims, 24 Drawing Sheets

(56) References Cited

U.S. PATENT DOCUMENTS

| | | | | |
|---|---|---|---|---|
| 10,944,980 | B2 | 3/2021 | Morishige et al. | |
| 10,997,895 | B2 | 5/2021 | Bae et al. | |
| 2017/0263206 | A1* | 9/2017 | Bae | G09G 5/395 |
| 2020/0168183 | A1* | 5/2020 | Kim | G09G 5/003 |
| 2022/0036497 | A1* | 2/2022 | Bellamy | G06F 21/84 |

FOREIGN PATENT DOCUMENTS

| | | | |
|---|---|---|---|
| KR | 101732468 | B1 | 5/2017 |
| KR | 20180087644 | A | 8/2018 |
| KR | 102057504 | B1 | 1/2020 |
| KR | 102072781 | B1 | 2/2020 |
| KR | 102189928 | B1 | 12/2020 |

* cited by examiner

FIG. 7

| | SEL1 | SEL2 | SEL3 |
|---|---|---|---|
| CASE1 | 1 | 1 | 0 |
| CASE2 | 0 | 1 | 1 |

FIG. 15

| FR \ PRM | PRM11 | PRM12 | ··· | PRM1a |
|---|---|---|---|---|
| FR1 | PRM11-1 | PRM12-1 | ··· | PRM1a-1 |
| FR2 | PRM11-2 | PRM12-2 | ··· | PRM1a-2 |
| FR3 | PRM11-3 | PRM12-3 | ··· | PRM1a-3 |
| FR \ PRM | PRM21 | PRM22 | ··· | PRM2b |
| FR1 | PRM21-1 | PRM22-1 | ··· | PRM2b-1 |
| FR2 | PRM21-2 | PRM22-2 | ··· | PRM2b-2 |
| FR3 | PRM21-3 | PRM22-3 | ··· | PRM2b-3 |
| FR \ PRM | PRM31 | PRM32 | ··· | PRM3c |
| FR1 | PRM31-1 | PRM32-1 | ··· | PRM3c-1 |
| FR2 | PRM31-2 | PRM32-2 | ··· | PRM3c-2 |
| FR3 | PRM31-3 | PRM32-3 | ··· | PRM3c-3 |

10a

DISPLAY DRIVER INTEGRATED CIRCUIT AND METHOD OF OPERATING THE SAME

CROSS-REFERENCE TO RELATED APPLICATION

This U.S. non-provisional application claims priority under 35 USC § 119 to Korean Patent Application No. 10-2021-0150243, filed on Nov. 4, 2021, in the Korean Intellectual Property Office (KIPO), the disclosure of which is incorporated by reference herein in its entirety.

BACKGROUND

1. Technical Field

Example embodiments relate generally to semiconductor integrated circuits and, more particularly, to a display driver integrated circuit and a method of operating the display driver integrated circuit.

2. Discussion of the Related Art

A display system using an organic light emitting diode (OLED) display device or a liquid crystal display (LCD) device may be driven at a speed of 120 Hz or higher to provide excellent image quality without interruption. However, as a display system is driven at higher frequencies, power consumption by the display system may increase. To reduce power consumption by the display system, technologies, such as a panel self-refresh technology (PSR) or a partial update technology have been developed. However, those technologies may only reduce power consumption of a host processor included in the display system, and may not reduce power consumption of a display driver integrated circuit included in the display system.

SUMMARY

Some example embodiments may provide a method and an apparatus for a display driver integrated circuit, which may be capable of reducing power consumption and computational complexity.

According to example embodiments, a display driver integrated circuit includes a frame buffer, a plurality of image processing circuits and an image processing controller. The frame buffer is configured to sequentially store a plurality of frame data received from a host processor. Each of the plurality of frame data includes a plurality of data slices. The plurality of image processing circuits is configured to perform image signal processing operations, respectively, on ones of the plurality of data slices that are included in a respective one of the plurality of frame data and which are sequentially retrieved from the frame buffer. The image processing controller is configured to bypass at least one of the plurality of image processing circuits by applying a bypass control signal to the plurality of image processing circuits based on a first plurality of data slices included in a first one of the plurality of frame data and a second plurality of data slices included in a second one of the plurality of frame data. The first one of the plurality of frame data is stored in the frame buffer and the second one of the plurality of frame data is received after the first one of the plurality of frame data from the host processor. The second one of the plurality of data slices corresponds to the first one of the plurality of data slices.

According to example embodiments, in a method of operating a display driver integrated circuit, a first data slice included in first frame data is retrieved from a frame buffer. A second data slice included in second frame data is received from a host processor. A first comparison signal representing whether the first data slice is equal to the second data slice is generated. At least one of a plurality of image processing circuits is bypassed based on the first comparison signal.

According to example embodiments, a display driver integrated circuit includes a frame buffer, a plurality of image processing circuits and an image processing controller. The frame buffer is configured to sequentially store a plurality of frame data received from a host processor. Each of the plurality of frame data includes a plurality of data slices. The plurality of image processing circuits is configured to perform image signal processing operations, respectively, on ones of the plurality of data slices which are retrieved from the frame buffer sequentially and included in one frame data. The image processing controller is configured to generate a comparison signal representing whether a first one of the plurality of data slices is equal to a second one of the plurality of data slices. The image processing controller is further configured to bypass at least one of the plurality of image processing circuits based on the comparison signal. The first one of the plurality of data slices is included in first frame data stored in the frame buffer. The second one of the plurality of data slices is included in second frame data received after the first frame data from the host processor. The second one of the plurality of data slices corresponds to the first one of the plurality of data slices. The image processing controller includes a comparison circuit and a control signal generator. The comparison circuit is configured to output the comparison signal based on first values included in the first one of the plurality of data slices and second values included in the second one of the plurality of data slices. The control signal generator is configured to output an image processing circuit control signal used to control each of the plurality of image processing circuits based on the comparison signal and image processing circuit information. The image processing circuit information represents target image types of the image signal processing operations performed by the plurality of image processing circuits. The plurality of image processing circuits includes a first image processing circuit, a second image processing circuit and a third image processing circuit. The first image processing circuit is configured to perform a first image signal processing operation on a moving image. The second image processing circuit is configured to perform a second image signal processing operation on the moving image and a still image. The third image processing circuit is configured to perform a third image signal processing operation on the still image.

BRIEF DESCRIPTION OF THE DRAWINGS

Example embodiments of the present disclosure will be more clearly understood from the following detailed description taken in conjunction with the accompanying drawings.

FIG. 7 is a diagram illustrating an example embodiment of control signals provided to the image processing unit of FIG. 6.

FIG. 15 is a diagram that illustrates an example of parameter sets used by each of a plurality of sub-image processing circuits in FIG. 14 to perform an image signal processing operation.

DETAILED DESCRIPTION OF THE EMBODIMENTS

Figure 1:
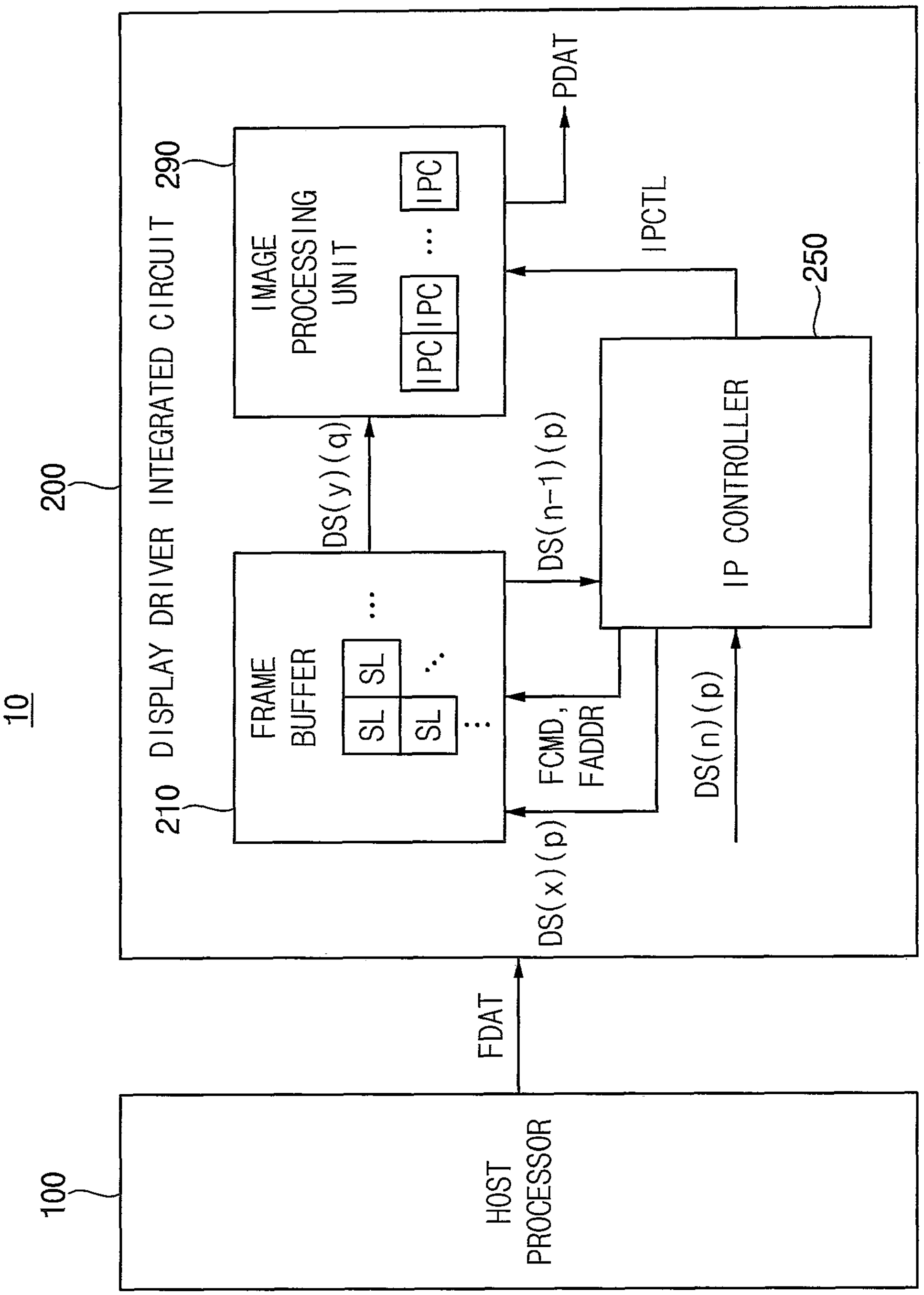
FIG. 1 is a block diagram illustrating a display system including a display driver integrated circuit according to example embodiments.

Various example embodiments will be described more fully hereinafter with reference to the accompanying drawings, in which some example embodiments are shown. The present disclosure may, however, be embodied in many different forms and should not be construed as limited to the embodiments set forth herein. In the drawings, like numerals refer to like elements throughout this application and repeated descriptions may be omitted. It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram illustrating a display system including a display driver integrated circuit according to example embodiments.

Referring to FIG. 1, a display system 10 may include a host processor 100 and a display driver integrated circuit 200.

The host processor 100 may be configured to control overall operations of the display system 10. For example, the host processor 100 may include a central processing unit, a display controller, an encoder, a display transmission interface and other various components, may be configured to generate a plurality of frame data FDAT using components included in the host processor 100, and may provide the plurality of frame data FDAT to the display driver integrated circuit 200 sequentially.

In some embodiments, the host processor 100 may be referred to as an application processor, and the host processor 100 may be implemented in a form of a system-on-chip (SoC).

The display driver integrated circuit 200 may be configured to sequentially receive the plurality of frame data FDAT from the host processor 100, and may be configured to perform various signal processing operations including image signal processing operations on the plurality of frame data FDAT. The display driver integrated circuit 200 may be configured to provide image data PDAT on which the signal processing operations have been performed to a display panel (not shown), and may provide various control signals to the display panel to display the image data PDAT.

The display driver integrated circuit 200 may include a frame buffer 210, an image processing controller 250 and an image processing unit 290 including a plurality of image processing circuits IPCs.

The frame buffer 210 may be configured to store the plurality of frame data FDAT from the host processor sequentially, and the image processing unit 290 may be configured to perform image signal processing operations on the plurality of frame data FDAT sequentially retrieved from the frame buffer 210 using the plurality of image processing circuits IPCs. The plurality of image processing circuits IPCs may be configured to perform image signal processing operations on data slices, which are retrieved from the frame buffer 210 sequentially and included in one frame data of the plurality of frame data FDAT. Each of the plurality of image processing circuits IPCs may include a first image processing circuit, a second image processing circuit, and a third image processing circuit. The first image processing circuit may be configured to perform a first image signal processing operation on a moving image. The second image processing circuit may be configured to perform a second image signal processing operation on the moving image and a still image. The third image processing circuit may be configured to perform a third image signal processing operation on the still image.

The image processing controller 250 may be configured to control overall operations of the frame buffer 210 and the image processing unit 290. For example, the image processing controller 250 may be configured to divide each of the plurality of frame data FDAT received from the host processor 100 into a plurality of data slices, and store (or manage) each of the plurality of frame data in a form of a plurality of data slices in the frame buffer 210. For example, the image processing controller 250 may retrieve each of the plurality of frame data FDAT in a form of the plurality of data slices from the frame buffer 210 and provide the plurality of data slices to the image processing unit 290. For example, the image processing controller 250 may be configured to control a manner in which all or a portion of the data slices are provided to the image processing unit 290 to bypass at least one of the plurality of image processing circuits IPCs, based on first data slices stored in the frame buffer 210 and second data slices received from the host processor 100.

In some embodiments, the image processing controller 250 may be configured to retrieve a first data slice DS(n−1)(p) included in a first frame data from the frame buffer 210, and receive a second data slice DS(n)(p) included in a second frame data from the host processor 100. The first frame data may correspond to a previous frame, and the second frame data may correspond to a present frame. The present frame may be a frame immediately after the previous frame. In the first data slice DS(n−1)(p), 'n−1' may represent that the first data slice DS(n−1)(p) is included in the previous frame, and in the second data slice DS(n)(p), 'n' may represent that the second data slice DS(n)(p) is included in the present frame. In the first data slice DS(n−1)(p) and the second data slice DS(n)(p), 'p' may represent that the first data slice DS(n−1)(p) and the second data slice DS(n)(p) are data slices that correspond to the same slice region SL in the first frame data and the second frame data, respectively. The slice region SL may be each divided region when one frame is divided into a plurality of regions according to a predetermined scheme. When frame data corresponding to one frame is divided based on the slice region SL, each division of the data may be referred to as a 'data slice'. For example, the first data slice DS(n−1)(p) may be one of a first plurality of data slices included in the first frame of the plurality of frame data FDAT, the second data slice DS(n)(p) may be one of a second plurality of data slices included in the first frame of the plurality of frame data FDAT, and the second data slice DS(n)(p) may correspond to the first data slice DS(n−1)(p).

In some embodiments, the image processing controller 250 may bypass at least one of the plurality of image processing circuits IPCs by applying bypass control signals (refer to SEL1, SEL2 and SEL3 in FIG. 6) to the image processing unit 290 based on the first data slice DS(n−1)(p) and the second data slice DS(n)(p). That is, the image processing controller 250 may be configured to compare the first data slice DS(n−1)(p) with the second data slice DS(n)(p) to generate a comparison signal representing whether the first data slice DS(n−1)(p) is equal to the second data slice DS(n)(p). The image processing controller 250 may be configured to bypass at least one of the plurality of image processing circuits IPCs based on the comparison signal. For example, at least one DS(y)(q) of data slices may be output from the image processing unit 290 without performing at least one of the image signal processing operations performed by the plurality of image processing circuits IPCs, based on the comparison signal.

In some embodiments, the image processing controller 250 may be configured to output a frame buffer command FCMD and a frame buffer address FADDR to the frame buffer 210 to control the frame buffer 210, and may be configured to output an image processing circuit control signal IPCTL to the image processing unit 290 to control the image processing unit 290.

As described above, the display driver integrated circuit 10 may control the manner in which all or a portion of the data slices are provided to the image processing unit 290 to bypass at least one of the plurality of image processing circuits IPCs. The display driver integrated circuit 10 may be configured to efficiently reduce power consumption in the display driver integrated circuit 10 by omitting image signal processing operations associated with the bypassed data slices. The display driver integrated circuit 10 may be configured to receive a plurality of frame data from the host processor 100 sequentially and may be configured to process each of the plurality of frame data FDAT in units of data slices inside the display driver integrated circuit 10. Thus, the display driver integrated circuit 10 may be configured to efficiently reduce computational complexity used in a process of reducing power consumption.

Figure 2:
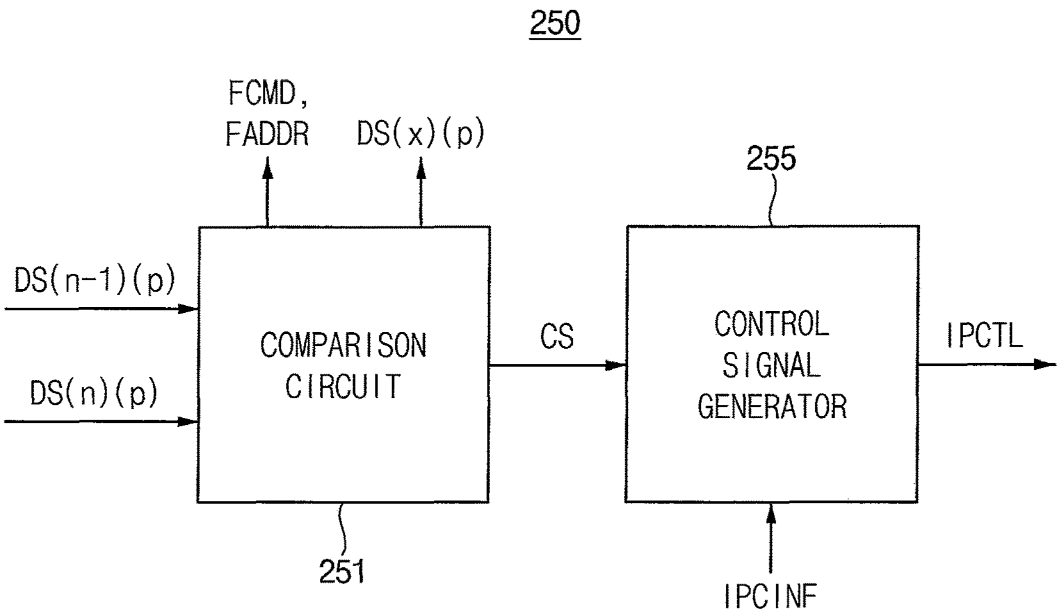
FIG. 2 is a block diagram illustrating an example embodiment of the image processing controller in FIG. 1.

FIG. 2 is a block diagram illustrating an example embodiment of the image processing controller in FIG. 1.

Referring to FIGS. 1 and 2, the image processing controller 250 may include a comparison circuit 251 and a control signal generator 255.

The comparison circuit 251 may be configured to retrieve the first data slice DS(n−1)(p) included in the first frame data from the frame buffer 210, and may be configured to receive the second data receive the second data slice DS(n)(p) included in the second frame data from the host processor 100.

The comparison circuit 251 may be configured to compare the first data slice DS(n−1)(p) with the second data slice DS(n)(p) to output a comparison signal CS representing whether the first data slice DS(n−1)(p) is equal to the second data slice DS(n)(p).

In some embodiments, the comparison circuit 251 may be configured to output the comparison signal CS based on first values included in the first data slice DS(n−1)(p) and second values included in the second data slice DS(n)(p).

In some embodiments, the comparison circuit 251 may be configured to output the comparison signal CS based on a first cyclic redundancy check (CRC) parity value and a second CRC parity value. The first CRC parity value may be generated based on the first values, and the second CRC parity value may be generated based on the second values. For example, the first CRC parity value may be obtained as a result of performing a CRC operation on the first values, and the second CRC parity value may be obtained as a result of performing the CRC operation on the second values.

The control signal generator 255 may be configured to receive the comparison signal CS from the comparison circuit 251 and may be configured to receive image processing circuit information IPCINF from an external source.

In some embodiments, the image processing circuit information IPCINF may represent types of images that may be targets of the image signal processing operations performed by the plurality of image processing circuits IPCs. For example, the targets of the image signal processing operations, i.e., target image types, may include a moving image and/or a still image, and the image processing circuit information IPCINF may represent that each of the plurality of image processing circuits IPCS corresponds to one of the first image processing circuit, the second image processing circuit, and the third image processing circuit described above with reference to FIG. 1.

The control signal generator 255 may be configured to output the image processing circuit control signal IPCTL used to control each of the plurality of image processing circuits IPCs based on the comparison signal CS and the image processing circuit information IPCINF.

The comparison circuit 251 may be configured to compare the first data slice DS(n−1)(p) with the second data slice DS(n)(p) to update one of the plurality of data slices stored in the frame buffer 210.

In some embodiments, the comparison circuit 251 may be configured to maintain the first data slice DS(n−1)(p) stored in the frame buffer 210 in response to the first data slice DS(n−1)(p) being equal to the second data slice DS(n)(p). The comparison circuit 251 may be configured to replace the first data slice DS(n−1)(p) stored in the frame buffer 210 with the second data slice DS(n)(p) in response to the first data slice DS(n−1)(p) being different from the second data slice DS(n)(p), e.g., DS(x)(p)=DS(n)(p).

Figure 3:
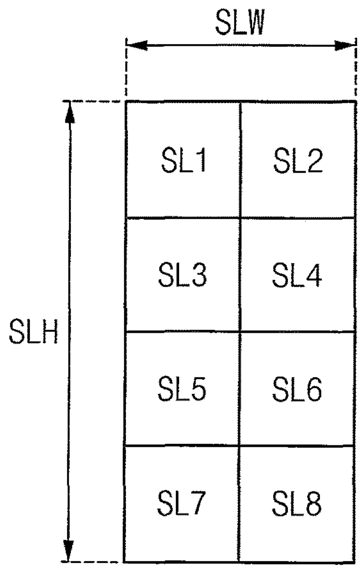
FIG. 3 is a diagram that illustrates a plurality of slice regions used to generate a plurality of data slices by dividing one frame data.

FIG. 3 is a diagram that illustrates a plurality of slice regions used to generate a plurality of data slices by dividing one frame data of the plurality of frame data FDAT.

Referring to FIG. 3, a plurality of slice regions SL1, SL2, SL3, SL4, SLS, SL6, SL7, and SL8 may correspond to one frame of a display panel.

In one embodiment, a height SLH and a width SLW of all of the slice regions SL1 to SL8 may correspond to a height and a width of frame data representing one frame, respectively; however, the height SLH and the width SLW are not limited thereto. In another embodiment, when the frame data is encoded according to a predetermined scheme by a host processor, the height SLH and the width SLW of all of the slice regions SL1 to SL8 may correspond to a height and a width of the encoded frame data. In such embodiments, each of the plurality of data slices may be obtained by dividing the frame data by predetermined size.

A size of each of the plurality of slice regions SL1 to SL8 may be greater than or equal to a minimum size based on a predetermined standard.

In one embodiment, the size of each of the plurality of slice regions SL1 to SL8 may be greater than or equal to a minimum size determined by a video electronics standards association (VESA) standard associated with a standardization of video and multimedia devices; however, the size of each of the plurality of slice regions SL1 to SL8 is not limited thereto. In another embodiment, when a display system drives different regions of a display panel in different schemes based on specific applications, regions driven in the same scheme may be set as one slice region. For example, the first to fourth slice regions SL1 to SL4 may be aggregated to form one slice region, and the fifth to eight slice regions SL5 to SL8 may be aggregated to form another slice region.

Figure 4:
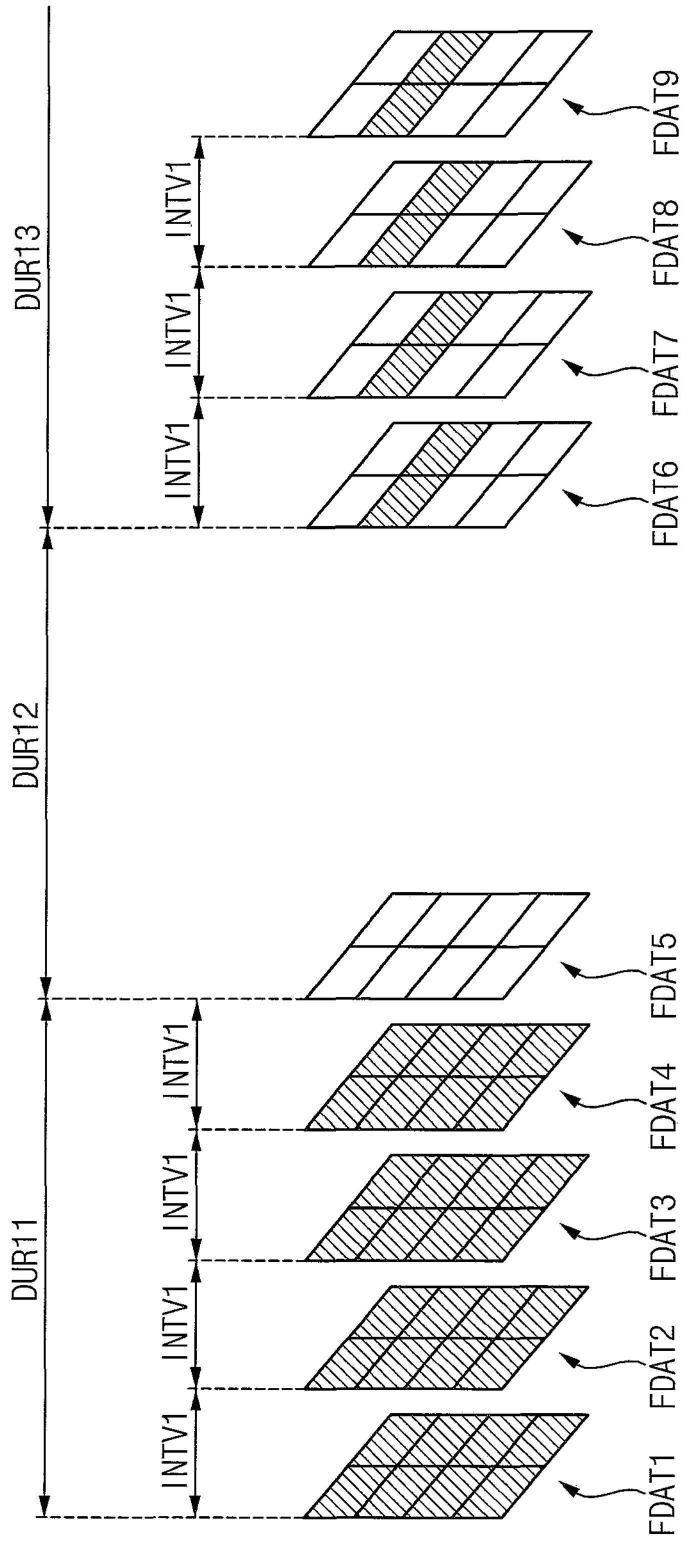
FIG. 4 is a diagram that illustrates a plurality of frame data sequentially retrieved from the host processor in FIG. 1.

FIG. 4 is a diagram that illustrates a plurality of frame data sequentially retrieved from the host processor in FIG. 1.

Referring to FIG. 4, a plurality of frame data FDAT1, FDAT2, FDAT3, FDAT4, FDATS, FDAT6, FDAT7, FDAT8 and FDAT9 respectively corresponding to a plurality of frames may be transmitted from a host processor, e.g., 100 in FIG. 1, to a display driver integrated circuit, e.g., 200 in FIG. 1, during a plurality of time intervals DUR11, DUR12, and DUR13. Each of the plurality of frame data FDAT1 to FDAT9 may include a plurality of data slices divided based on a plurality of slice regions SL1 to SL8 described above with reference to FIG. 3, and each of the plurality of data slices may be transmitted from the host processor to the display driver integrated circuit based on a predetermined serial interface communication standard.

Among the plurality of frame data FDAT1 to FDAT9, (n−1)-th frame data FDAT(n−1) and n-th frame data FDAT(n) may be compared with each other in units of data slices. The n-th frame data FDAT(n) may be frame data received from the host processor immediately after the (n−1)-th frame data FDAT(n−1), where n is an integer greater than or equal to two and less than or equal to nine. A process of comparing the (n−1)-th frame data FDAT(n−1) with the n-th frame data FDAT(n) will be described with reference to FIG. 5.

Hereinafter, when the (n−1)-th frame data FDAT(n−1) is referred to as 'present frame data', the n-th frame data FDAT(n) may be referred to as 'next frame data', and when the n-th frame data FDAT(n) is referred to as 'present frame data', the (n−1)-th frame data FDAT(n−1) may be referred to as 'previous frame data'.

In FIG. 4, among data slices included in the plurality of frame data FDAT1 to FDAT9, data slices of the present frame data, e.g., FDAT(n), having different values from corresponding data slices of the previous frame data, e.g., FDAT(n−1), may be represented by hatching. For example, all of data slices included in the second frame data FDAT2 may be different from data slices included in the previous frame data, e.g., the first frame data FDAT1. All of data slices included in each of the third frame data FDAT3 and the fourth frame data FDAT4 may also be different from data slices included in a previous frame data, e.g., the second frame data FDAT2 and the third frame data FDAT3, respectively. For example, all of data slices included in the fifth frame data FDATS may be equal to data slices included in the previous frame data, e.g., the fourth frame data FDAT4. For example, only a portion of data slices included in the sixth frame data FDAT6, the seventh frame data FDAT7 and the eighth frame data FDAT8 may be equal to data slices included in the previous frame data, e.g., the fifth frame data FDATS, the sixth frame data FDAT6 and the seventh frame data FDAT7, respectively.

A time interval between time points at which the previous frame data and the present frame data are transmitted may not be constant. For example, the present frame data, e.g., each of FDAT2 to FDATS, FDAT7 to FDAT9, may be transmitted after a first time interval INTV1 from a time point at which the previous frame data is transmitted, however, the present frame data, e.g., FDAT6, may be transmitted after a longer time interval than the first time interval INTV1 from a time point at which the previous frame data is transmitted.

Figure 5:
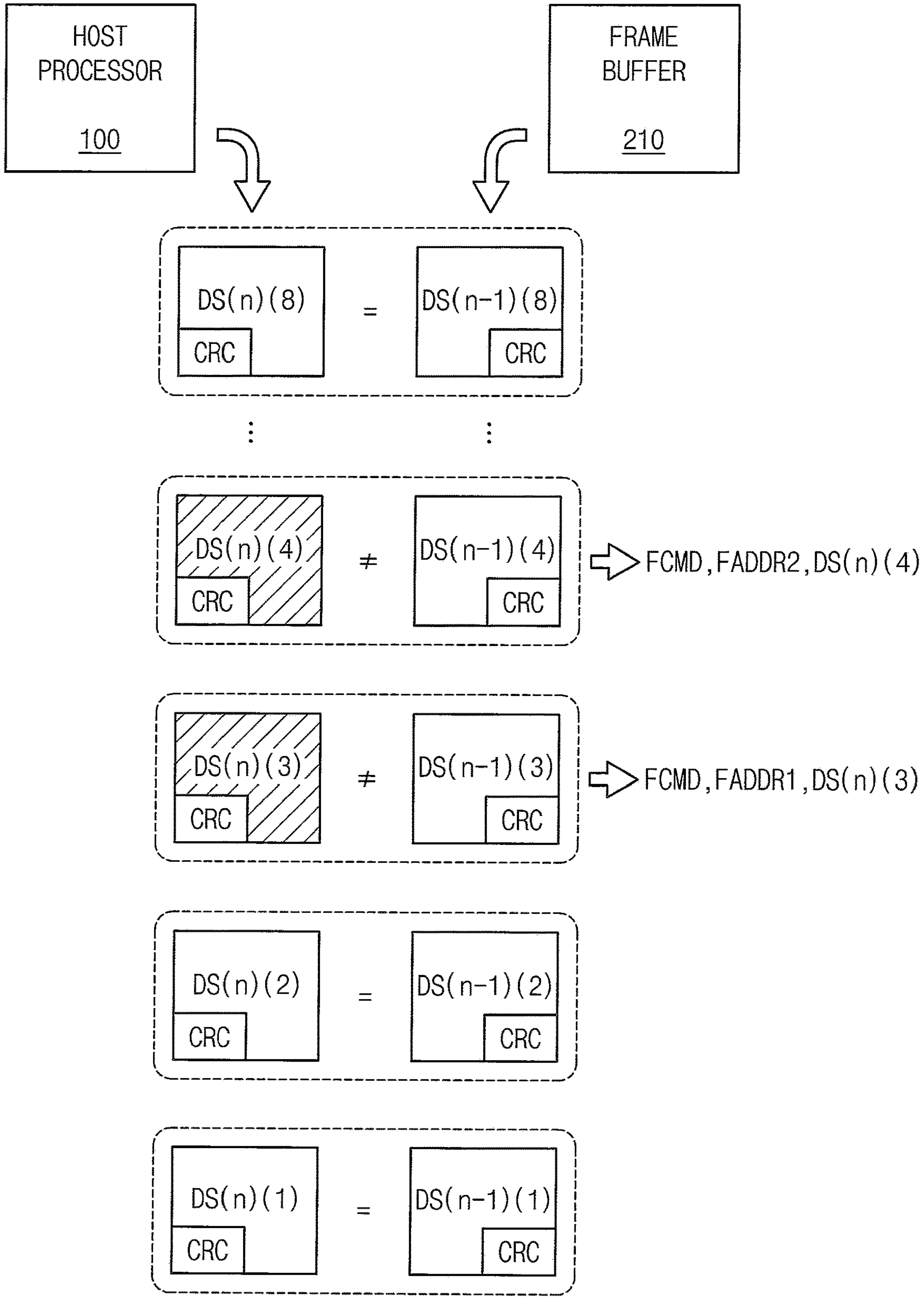
FIG. 5 is a diagram that illustrates a process of comparing a data slice received from the host processor in FIG. 1 with a data slice retrieved from the frame buffer in FIG. 1.

FIG. 5 is a diagram that illustrates a process of comparing a data slice received from the host processor in FIG. 1 with a data slice retrieved from the frame buffer in FIG. 1.

Referring to FIGS. 1, 2, 4, and 5, the frame buffer 210 may store the (n−1)-th frame data FDAT(n−1), and the host processor 100 may transmit the n-th frame data FDAT(n) to the display driver integrated circuit 200.

The comparison circuit 251 may retrieve the data slice DS(n−1)(p) included in the (n−1)-th frame data FDAT(n−1) stored in the frame buffer 210, receive the data slice DS(n)(p) included in the n-th frame data FDAT(n) from the host processor 100, and compare the data slice DS(n−1)(p) and the data slice DS(n)(p).

As illustrated in FIG. 5, the comparison circuit 251 may compare the data slice DS(n)(1) with the data slice DS(n−1)(1), and sequentially compare remaining data slices included in the (n−1)-th frame data FDAT(n−1) stored in the frame buffer 210 with remaining data slices included in the n-th frame data FDAT(n) from the host processor 100 in the same manner. As a result of the comparison, the comparison circuit 251 may determine that data slices DS(n)(1), DS(n)(2), DS(n)(5), DS(n)(6), DS(n)(7), and DS(n)(8) are equal to corresponding data slices DS(n−1)(1), DS(n−1)(2), DS(n−1)(5), DS(n−1)(6), DS(n−1)(7), and DS(n−1)(8), respectively. The comparison circuit 251 may determine that data slices DS(n)(3) and DS(n)(4) are different from corresponding data slices DS(n−1)(3) and DS(n−1)(4), respectively. In this case, the comparison circuit 251 may output the comparison signal CS representing that each of the data slices DS(n)(1), DS(n)(2), DS(n)(5), DS(n)(6), DS(n)(7), and DS(n)(8) is equal to a data slice included in the previous frame data, and output the comparison signal CS representing that each of the data slices DS(n)(3) and DS(n)(4) is different from a data slice included in the previous frame data.

In addition, when the data slice DS(n−1)(p) and the data slice DS(n)(p) are different from each other, the comparison circuit 251 may output the frame buffer command FCMD, the frame buffer address FADDR, and the data slice DS(n)(p) to the frame buffer 210. As illustrated in FIG. 5, the comparison circuit 251 may output a frame buffer command FCMD, a frame buffer address FADDR1, and the data slice DS(n)(3) to the frame buffer 210, and output the frame buffer command FCMD, a frame buffer address FADDR2, and the data slice DS(n)(4) to the frame buffer 210. For example, the frame buffer command FCMD may be a write request requesting to write a corresponding data slice to the frame buffer 210, and the frame buffer 210 may write only a data slice of the present frame data that is different from a data slice of the previous frame data based on the frame buffer address FADDR.

Figure 6:
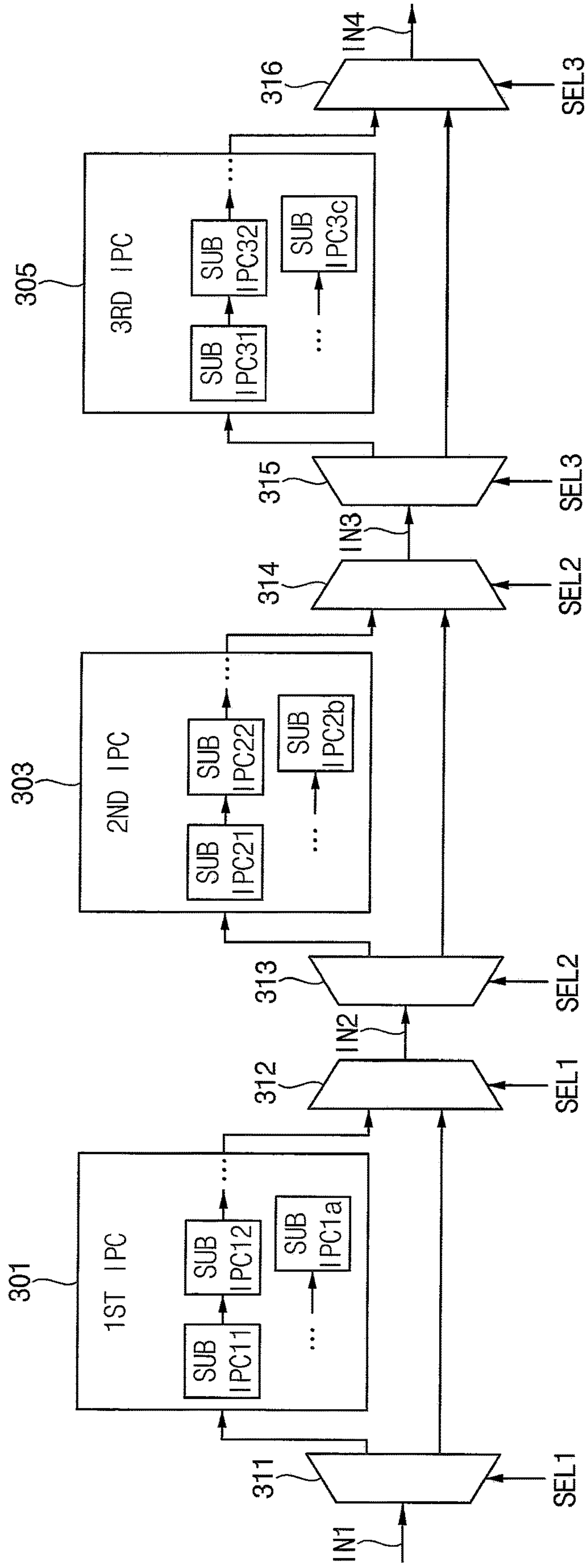
FIG. 6 is a block diagram illustrating an example embodiment of the image processing unit in FIG. 1.

FIG. 6 is a block diagram illustrating an example embodiment of the image processing unit in FIG. 1.

Referring to FIG. 6, an image processing unit 290 may include a first image processing circuit 301, a second image processing circuit 303, and a third image processing circuit 305, and each of the first to third image processing circuits 301, 303, and 305 may include a plurality of sub-image processing circuits. For example, the first image processing circuit 301 may include a plurality of sub-image processing circuits SUBIPC11, SUBIPC12, . . . , SUBIPC1*a*, the second image processing circuit 303 may include a plurality of sub-image processing circuits SUBIPC21, SUBIPC22, SUBIPC2*b*, and the third image processing circuit 305 may include a plurality of sub-image processing circuits SUBIPC31, SUBIPC32, SUBIPC3*c*.

In some embodiments, the first to third image processing circuits 301, 303, and 305 may be classified according to types of images that may be targets of image signal processing operations performed by various sub-image processing circuits. For example, the plurality of sub-image processing circuits SUBIPC11, SUBIPC12, SUBIPC1*a* included in the first image processing circuit 301 may perform a first image signal processing operation on a moving image. The plurality of sub-image processing circuits SUBIPC21, SUBIPC22, SUBIPC2*b* included in the second image processing circuit 303 may perform a second image signal processing operation on a moving image and a still image. The plurality of sub-image processing circuits SUBIPC31, SUBIPC32, SUBIPC3*c* may perform a third image signal processing operation on a still image.

The image processing unit 290 may further include demultiplexers 311, 313, and 315 and multiplexers 312, 314, and 316. For convenience of description, the demultiplexers 311, 313, and 315 and multiplexers 312, 314, and 316 are illustrated separately from the first to third image processing circuits 301, 303, and 305, however, the demultiplexers 311, 313, and 315 and multiplexers 312, 314, and 316 may be implemented as a single chip inside the first to third image processing circuits 301, 303, and 305. For example, the demultiplexer 311 and the multiplexer 312 may be implemented inside the first image processing circuit 301, the demultiplexer 313 and the multiplexer 314 may be implemented inside the second image processing circuit 303, and the demultiplexer 315 and the multiplexer 316 may be implemented inside the third image processing circuit 305. The demultiplexers 311, 313, and 315 and the multiplexers 312, 314, and 316 may be referred to as a 'bypass circuit'. The demultiplexer 311 and the multiplexer 312 may be referred to as a 'first bypass circuit'. The demultiplexer 313 and the multiplexer 314 may be referred to as a 'second bypass circuit'. The demultiplexer 315 and the multiplexer 316 may be referred to as a 'third bypass circuit'.

As illustrated in FIG. 6, the demultiplexer 311 may receive an input signal IN1 and output the input signal IN1 to one of the first image processing circuit 301 and the multiplexer 312. The multiplexer 312 may output one IN2 of a signal output from the first image processing circuit 301 and a signal output from the demultiplexer 311 to the demultiplexer 313. The demultiplexer 313 may receive the input signal IN2 and output the input signal IN2 to one of the second image processing circuit 303 and the multiplexer 314. The multiplexer 314 may output one IN3 of a signal output from the second image processing circuit 303 and a signal output from the demultiplexer 313 to the demultiplexer 315. The demultiplexer 315 may receive the input signal IN3 and output the input signal IN3 to one of the third image processing circuit 305 and the demultiplexer 316. The multiplexer 316 may output one IN4 of a signal output from the third image processing circuit 305 and a signal output from the demultiplexer 315.

Based on the above operations, the image processing unit 290 (or the first bypass circuit, the first image processing circuit 301) may bypass the input signal IN1 based on the control signal SEL1, the image processing unit 290 (or the second bypass circuit, the second image processing circuit 303) may bypass the input signal IN2 based on the control signal SEL2, and image processing unit 290 (or the third bypass circuit, the third image processing circuit 305) may bypass the input signal IN3 based on the control signal SEL3.

The control signals SEL1, SEL2 and SEL3 may be included in the image processing circuit control signal IPCTL described above with reference to FIG. 1, and various signals IN1, IN2, IN3, and IN4 inside the image processing unit 290 may be the data slices described above with reference to FIGS. 1, 2, 3, 4, and 5. The control signals SEL1, SEL2 and SEL3 may be referred to as bypass control signals. Therefore, the image processing controller 250 may bypass at least one of a plurality of image processing circuits such as the first image processing circuit 301, the second image processing circuit 303, and the third image processing circuit 305 by applying the bypass control signals SEL1, SEL2 and SEL3 based on a first a first plurality of data slices included in a first one of the plurality of frame data and a second plurality of data slices included in a second one of the plurality of frame data.

FIG. 7 is a diagram illustrating an example embodiment of control signals provided to the image processing unit of FIG. 6.

Referring to FIGS. 6 and 7, each of the control signals SEL1, SEL2, and SEL3 may assume one of a logic high state, e.g., '1', and a logic low state, e.g., '0' as a digital signal.

In CASE1, the control signals SEL1 and SEL2 may be set to the logic high, and the control signal SEL3 may be set to the logic low. In CASE2, the control signal SEL1 may be set to the logic low, and the control signals SEL2 and SEL3 may be set to the logic high.

In one embodiment, the CASE1 may be a case of bypassing the third image processing circuit 305, and the CASE2 may be a case of bypassing the first image processing circuit 301. In another embodiment, each of the first to third image processing circuits 301, 303 and 305 may bypass at least one of the plurality of data slices in units of data slices.

FIGS. 8A, 8B, 9A, 9B, 10A, and 10B are diagrams or timing diagrams that illustrate a process in which the image processing controller in FIG. 1 bypasses at least one of a plurality of image processing circuits.

As described above with reference to FIG. 6, the first image processing circuit 301 may perform first image signal processing operation on the moving image, the second image processing circuit 303 may perform second image signal processing operation on the moving image and the still image, and the third image processing circuit 305 may perform third image signal processing operation on the still image.

In FIGS. 8A, 8B, 9A, 9B, 10A and 10B, data slices DS1, DS2, DS3, DS4, DS5, DS6, DS7, and DS8 may be input sequentially as an input signal IN1, and each of the data slices DS1, DS2, DS3, DS4, DS5, DS6, DS7, and DS8 may be output through at least one of the first to third image processing circuits 301, 303, and 305.

Figure 8A:
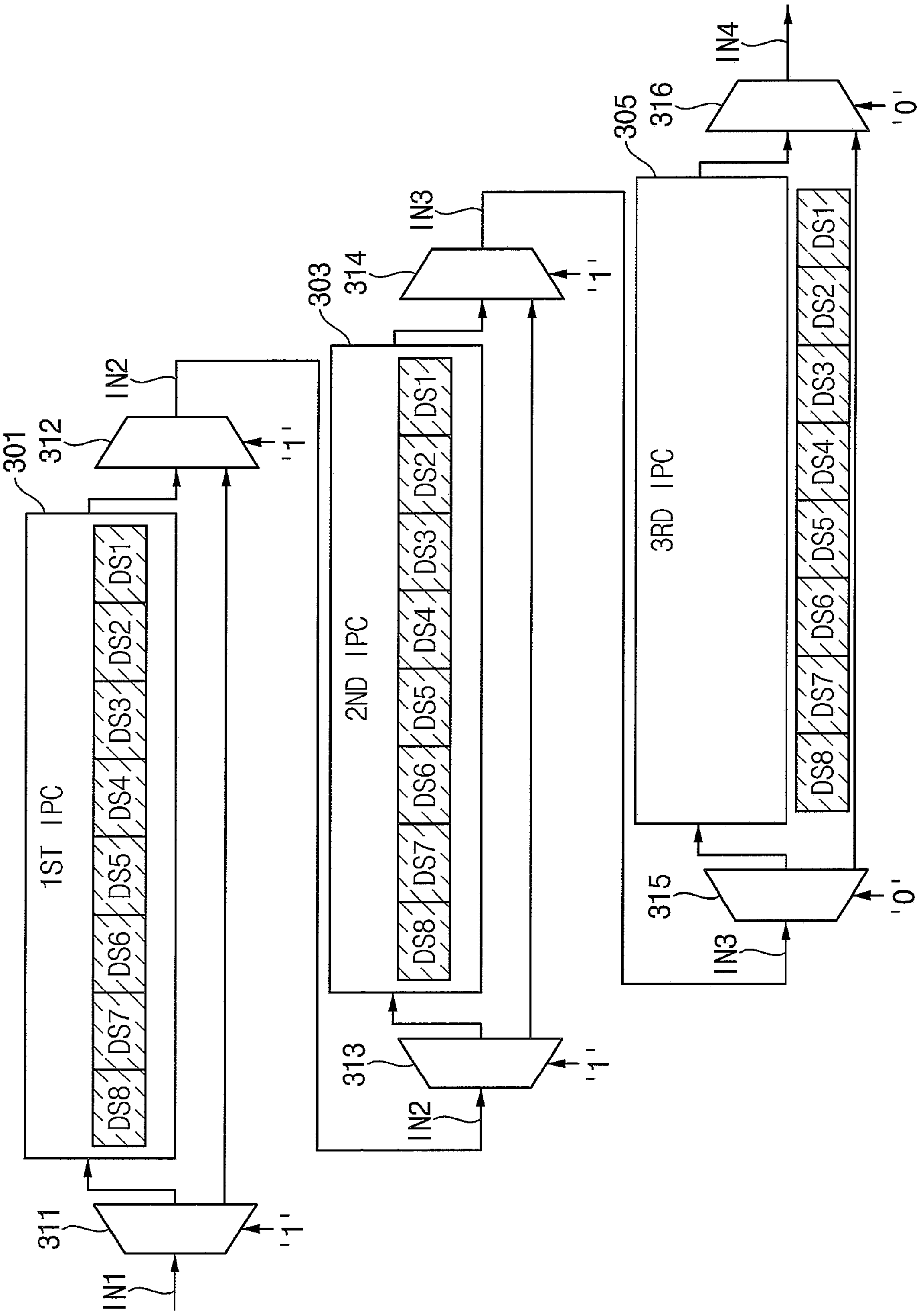
FIGS. 8A, 8B, 9A, 9B, 10A and 10B are diagrams or timing diagrams that illustrates a process in which the image processing controller in FIG. 1 bypasses at least one of a plurality of image processing circuits.
Figure 8B:
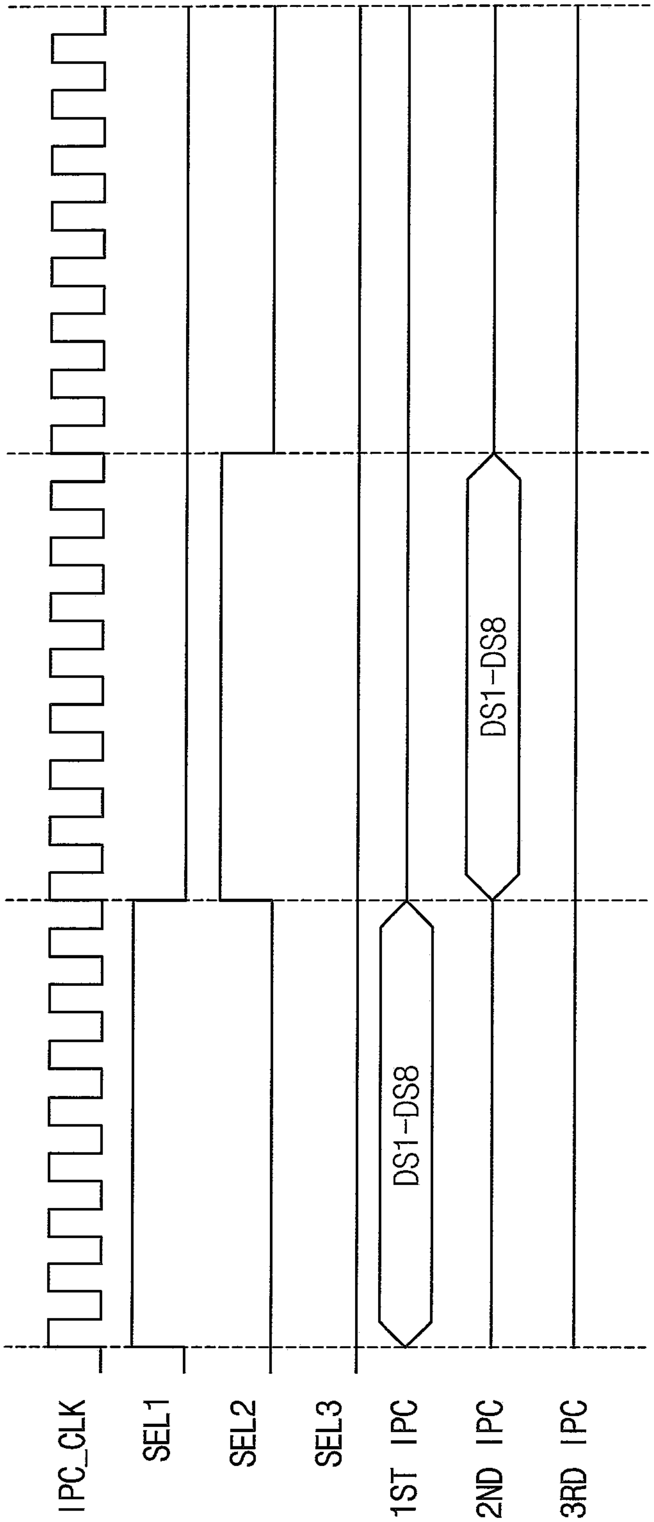

Referring to FIGS. 8A and 8B, each of the data slices DS1 to DS8 is different from corresponding data slice of previous frame data, e.g., represented by hatching. In this case, the data slices DS1 to DS8 may be processed by the first image processing circuit 301 for processing the moving image and the second image processing circuit 303 for processing both the moving image and the sill image, and bypass the third image processing circuit 305 for processing only the sill image. For example, the data slices DS1 to DS8 may be output without performing the third image signal processing operation. Based on driving clock IPC_CLK input to the image processing unit 290, while the control signal SEL1 has the logic high, the data slices DS1 to DS8 may be processed by the first image processing circuit 301, and while the control signal SEL2 has the logic high, the data slices DS1 to DS8 may be processed by the second image processing circuit 303. The data slices DS1 to DS8 may bypass the third image processing circuit 305.

Figure 9A:
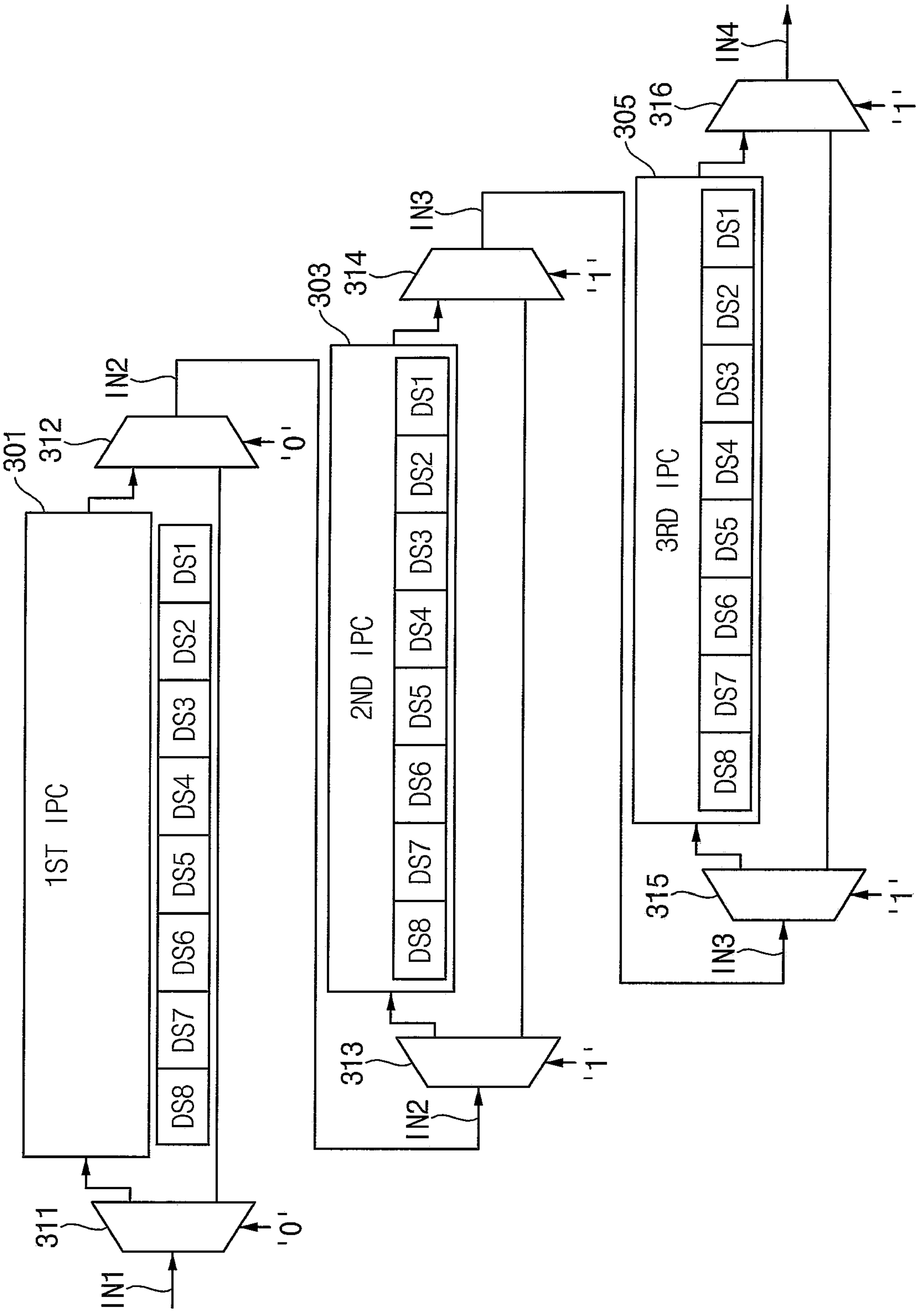
Figure 9B:
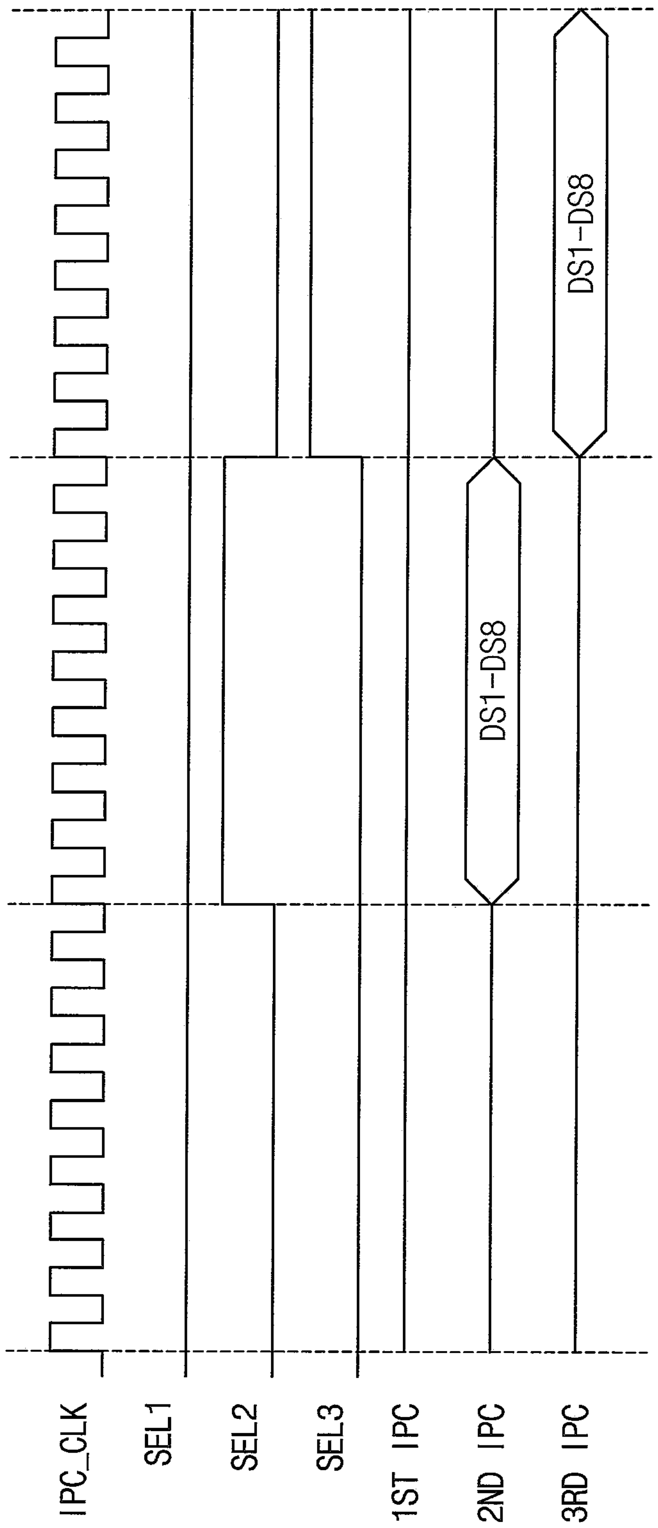

Referring to FIGS. 9A and 9B, each of the data slices DS1 to DS8 is equal to corresponding data slice of previous frame data, e.g., not represented by hatching. In this case, the data slices DS1 to DS8 may bypass the first image processing circuit 303, and be processed by the second image processing circuit 303 and the third image processing circuit 305. For example, the data slices DS1 to DS8 may be output without performing the first image signal processing operation. Based on the driving clock IPC_CLK input to the image processing unit 290, while the control signal SEL2 has the logic high, the data slices DS1 to DS8 may be processed by the second image processing circuit 303, and while the control signal SEL3 has the logic high, the data slices DS1 to DS8 may be processed by the third image processing circuit 305. The data slices DS1 to DS8 may bypass the first image processing circuit 301.

Figure 10A:
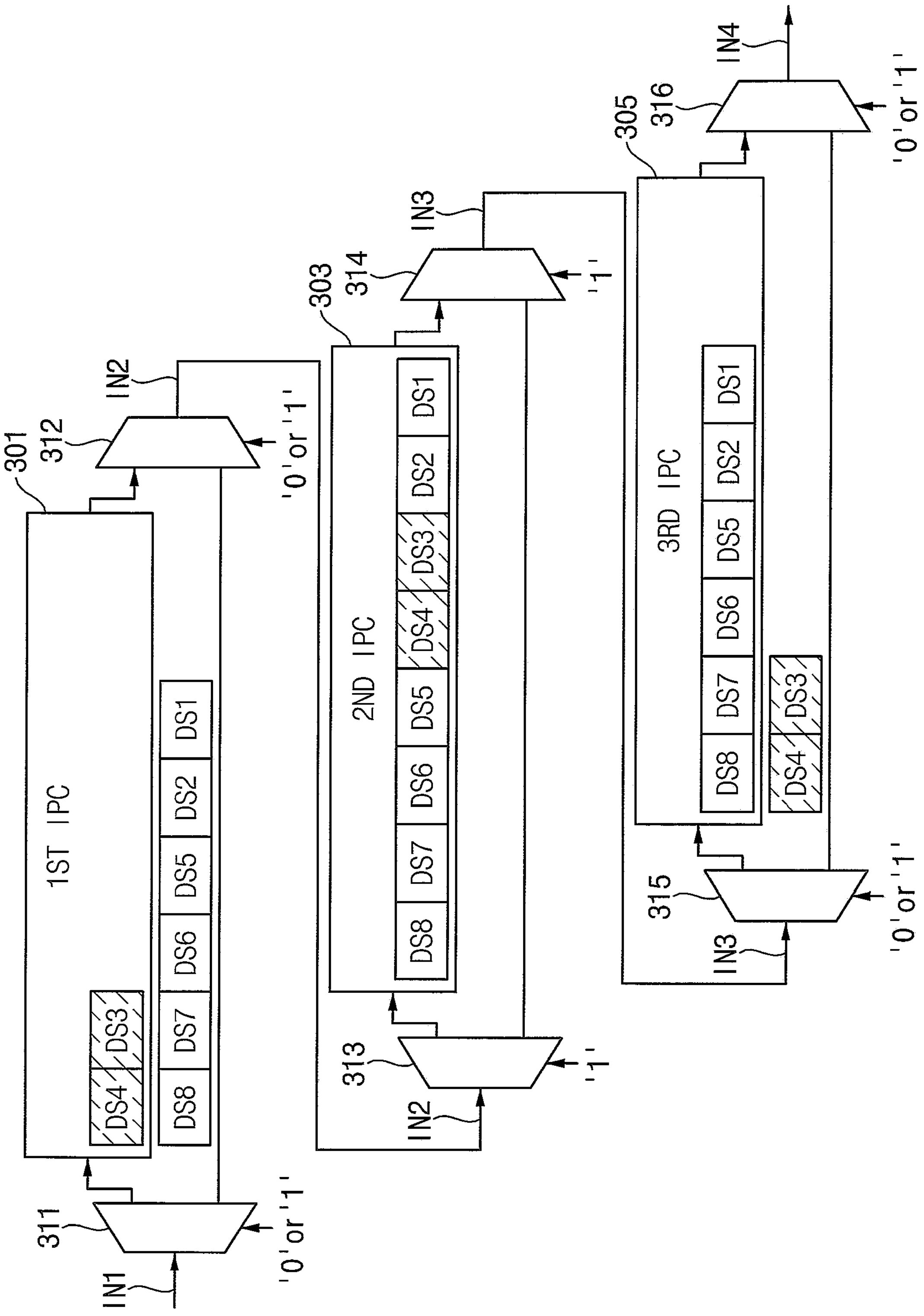
Figure 10B:
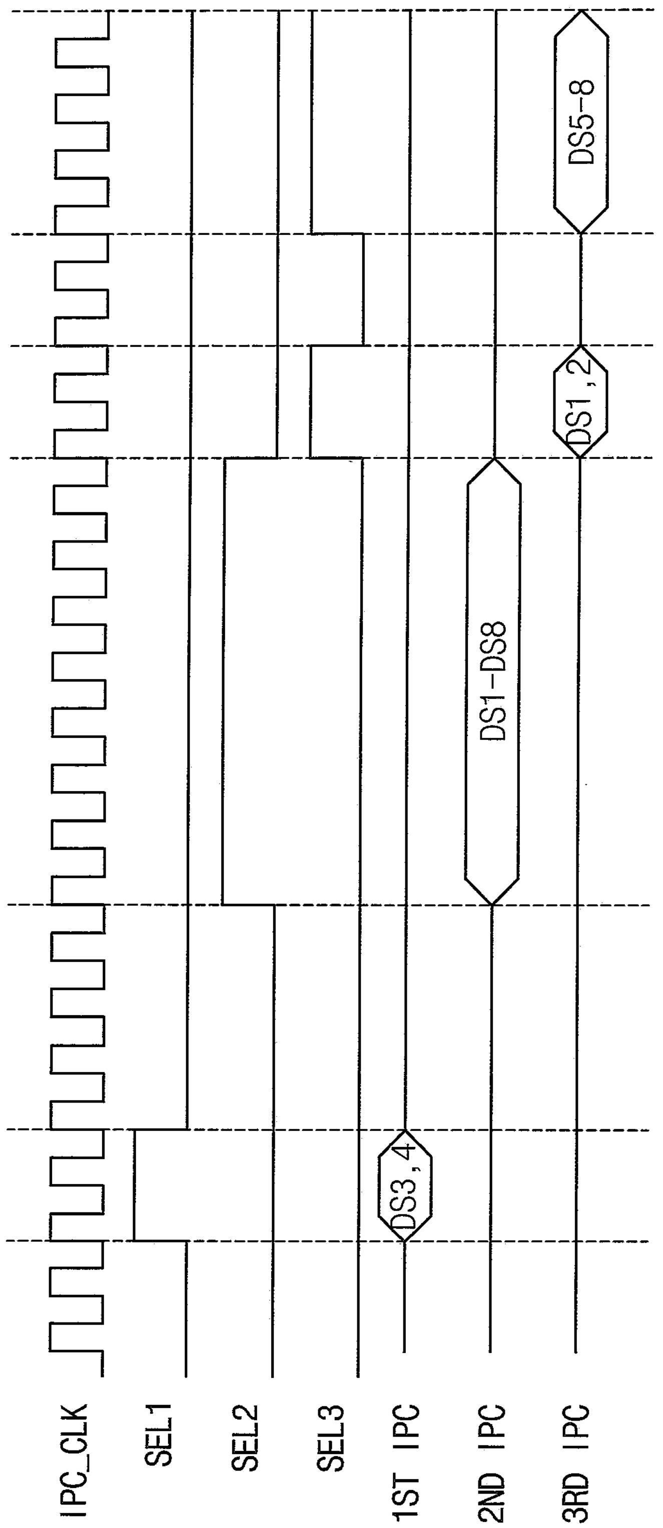

Referring to FIGS. 10A and 10B, data slices DS3 and DS4 among data slices DS1 to DS8 are different from corresponding data slices of previous frame data, e.g., represented by hatching, and data slices DS1, DS2, DS5 to DS8 among the data slices DS1 to DS8 are equal to corresponding data slices of previous frame data. In this case, the data slices DS3 and DS4 may be processed by the first image processing circuit 301 and the second image processing circuit 303, and bypass the third image processing circuit 305. In this case, the data slices DS1, DS2, DS5 to DS8 may bypass the first image processing circuit 301, and be processed by the second image processing circuit 303 and the third image processing circuit 305. For example, the data slices DS3 and DS4 may be output without performing the third image signal processing operation, and the data slices DS1, DS2, DS5 to DS8 may be output without performing the first image signal processing operation.

Based on the driving clock IPC CLK input to the image processing unit 290, while the control signal SEL1 has the logic high, the data slices DS3 and DS4 may be processed by the first image processing circuit 301, and while the control signal SEL1 has the logic low, the data slices DS1, DS2, DS5 to DS8 may bypass the first image processing circuit 301. While the control signal SEL2 has the logic high, the data slices DS1 to DS8 may be processed by the second image processing circuit 303. While the control signal SEL3 has the logic high, the data slices DS1, DS2, DS5 to DS8 may be processed by the third image processing circuit 305, and while the control signal SEL3 has the logic low, the data slices DS3 and DS4 may bypass the third image processing circuit 305.

Thus, in response to first data slice being equal to second data slice, the first data slice may bypass the first image processing circuit 301. For example, the first data slice may be output without performing the first image signal processing operation. The first data slice may be included in a first frame data stored in a frame buffer, and the second data slice may be included in a second frame data received after the first frame data from the host processor. The second data slice may correspond to the first data slice. Regardless of whether the first data slice is equal to the second data slice, the second image processing circuit 303 may perform the second image signal processing operation on the first data slice. In response to the first data slice being different from the second data slice, the first data slice may bypass the third image processing circuit 305. For example, the first data slice may be output without performing the third image signal processing operation.

Figure 11:
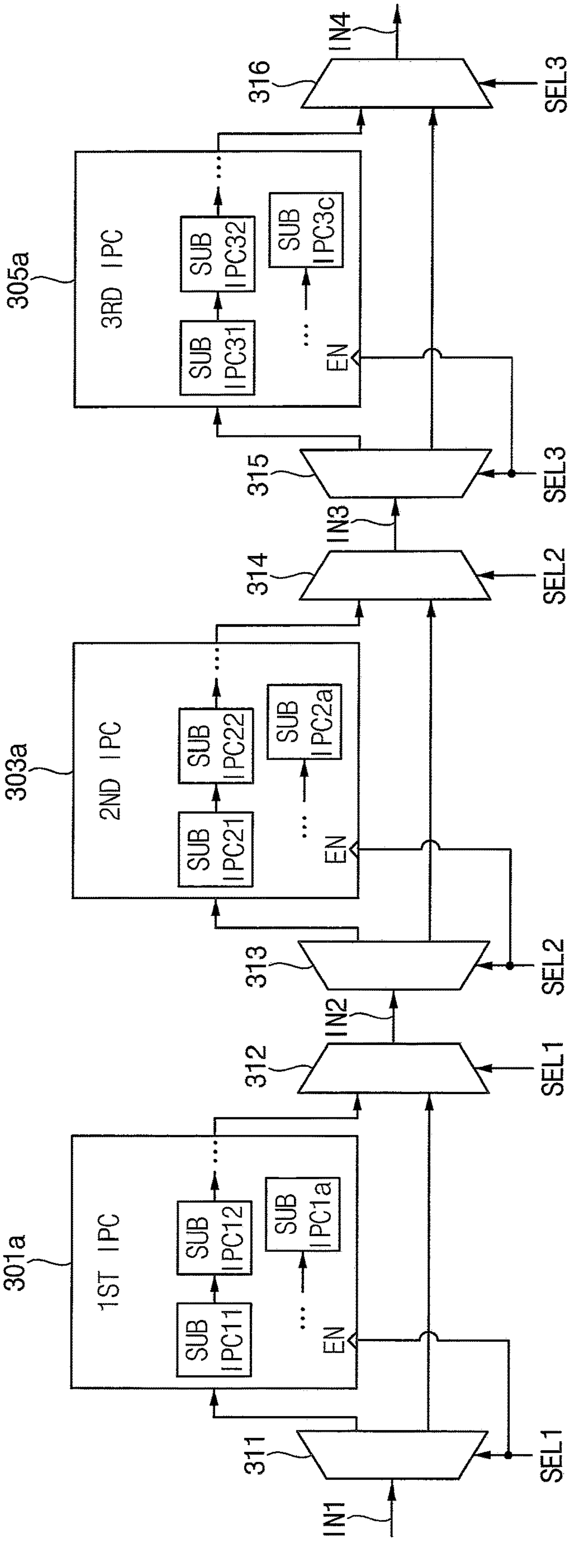
FIG. 11 is a block diagram illustrating an example embodiment of the image processing unit in FIG. 1.

FIG. 11 is a block diagram illustrating an example embodiment of the image processing unit in FIG. 1.

Referring to FIGS. 1, 6 and 11, first to third image processing circuits 301*a*, 303*a* and 305*a* include the addition of enable terminals EN as compared to the first to third image processing circuits 301, 303 and 305. Thus, duplicated descriptions will be omitted. The control signal SEL1 may be input to the enable terminal EN of the first image processing circuit 301, the control signal SEL2 may be input to the enable terminal EN of the second image processing circuit 303*a*, and the control signal SEL3 may be input to the enable terminal EN of the third image processing circuit 305*a*.

Based on the driving clock IPC CLK input to the image processing unit 290*a*, while the control signal SEL1 has the logic high, the first image processing circuit 301*a* may be enabled, and while the control signal SEL1 has the logic low, the first image processing circuit 301*a* may be disabled. While the control signal SEL2 has the logic high, the second image processing circuit 303*a* may be enabled, and while the control signal SEL2 has the logic low, the second image processing circuit 303*a* may be disabled. While the control signal SEL3 has the logic high, the third image processing circuit 305*a* may be enabled, and while the control signal SEL3 has the logic low, the third image processing circuit 305*a* may be disabled.

Thus, in response to a first data slice being equal to a second data slice, while the first data slice is output without performing the first image signal processing operation, the image processing controller 250 (or the image processing unit 290*a*) may disable the first image processing circuit 301*a*. The first data slice may be included in a first frame data stored in a frame buffer, and the second data slice may be included in a second frame data received after the first frame data from a host processor. The second data slice may correspond to the first data slice. In response to the first data slice being different from the second data slice, while the first data slice is being output without performing the third image signal processing operation, the image processing controller 250 (or the image processing unit 290*a*) may disable the third image processing circuit 305*a*.

Figure 12:
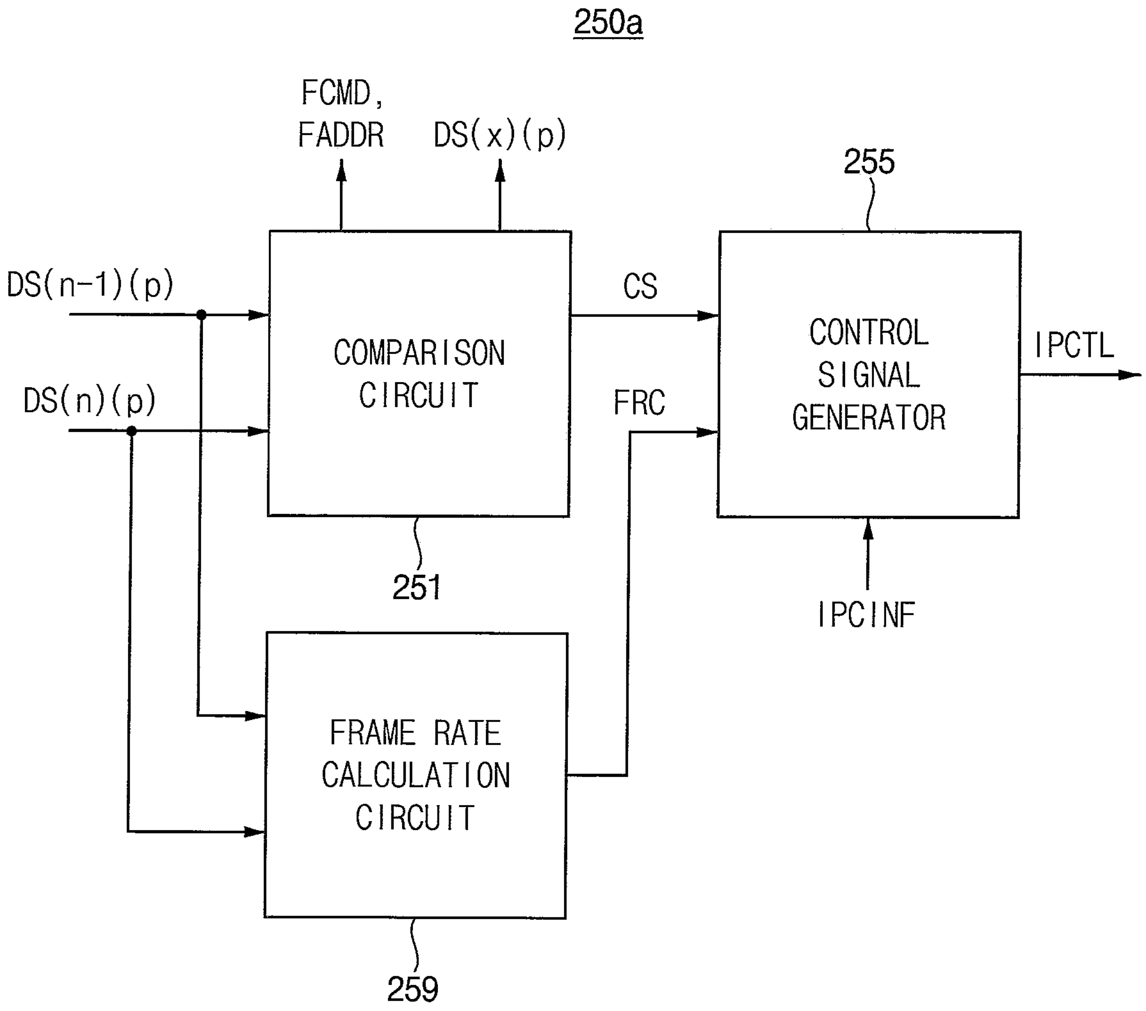
FIG. 12 is a block diagram illustrating an example embodiment of the image processing controller in FIG. 1.

FIG. 12 is a block diagram illustrating an example embodiment of the image processing controller in FIG. 1.

Referring to FIGS. 2 and 12, an image processing controller 250*a* includes the addition of a frame rate calculation circuit 259 as compared to the image processing controller 250. Thus, duplicated descriptions will be omitted.

The comparison circuit 251 may be configured to retrieve the first data slice DS(n−1)(p) included in the first frame data from the frame buffer 210, and may be configured to receive the second data slice DS(n)(p) included in the second frame data from the host processor 100.

The comparison circuit 251 may be configured to compare the first data slice DS(n−1)(p) with the second data slice DS(n)(p) to output the comparison signal CS representing whether the first data slice DS(n−1)(p) is equal to the second data slice DS(n)(p).

The frame rate calculation circuit 259 may be configured to determine a first receiving time point and a second receiving time point. The first receiving time point may represent a time point at which the first data slice DS(n−1)(p) is received from the host processor 100, and the second receiving time point may represent a time point at which the second data slice DS(n)(p) is received from the host processor 100. The frame rate calculation circuit 259 may be configured to calculate a first frame rate FRC based on a time interval from the first receiving time point to the second receiving time point, and output the first frame rate FRC.

In some embodiments, the first frame rate FRC may be calculated for each data slice based on the plurality of slice regions SL1 to SL8 described above with reference to FIG. 3. The first frame rate FRC will be described below with reference to FIGS. 13 and 14.

The control signal generator 255 may be configured to receive the comparison signal CS from the comparison circuit 251, and be configured to receive the first frame rate FRC from the frame rate calculation circuit 259 and receive the image processing circuit information IPCINF from an external source.

In some embodiments, the image processing circuit information IPCINF may represent types of images that may be targets of the image signal processing operations performed by the plurality of image processing circuits IPCs.

The control signal generator 255 may be configured to output the image processing circuit control signal IPCTL used to control each of the plurality of image processing circuits IPCs based on the comparison signal CS, the first frame rate FRC, and the image processing circuit information IPCINF. A process of setting the parameter sets will be described below with reference to FIGS. 14 and 15.

Figure 13:
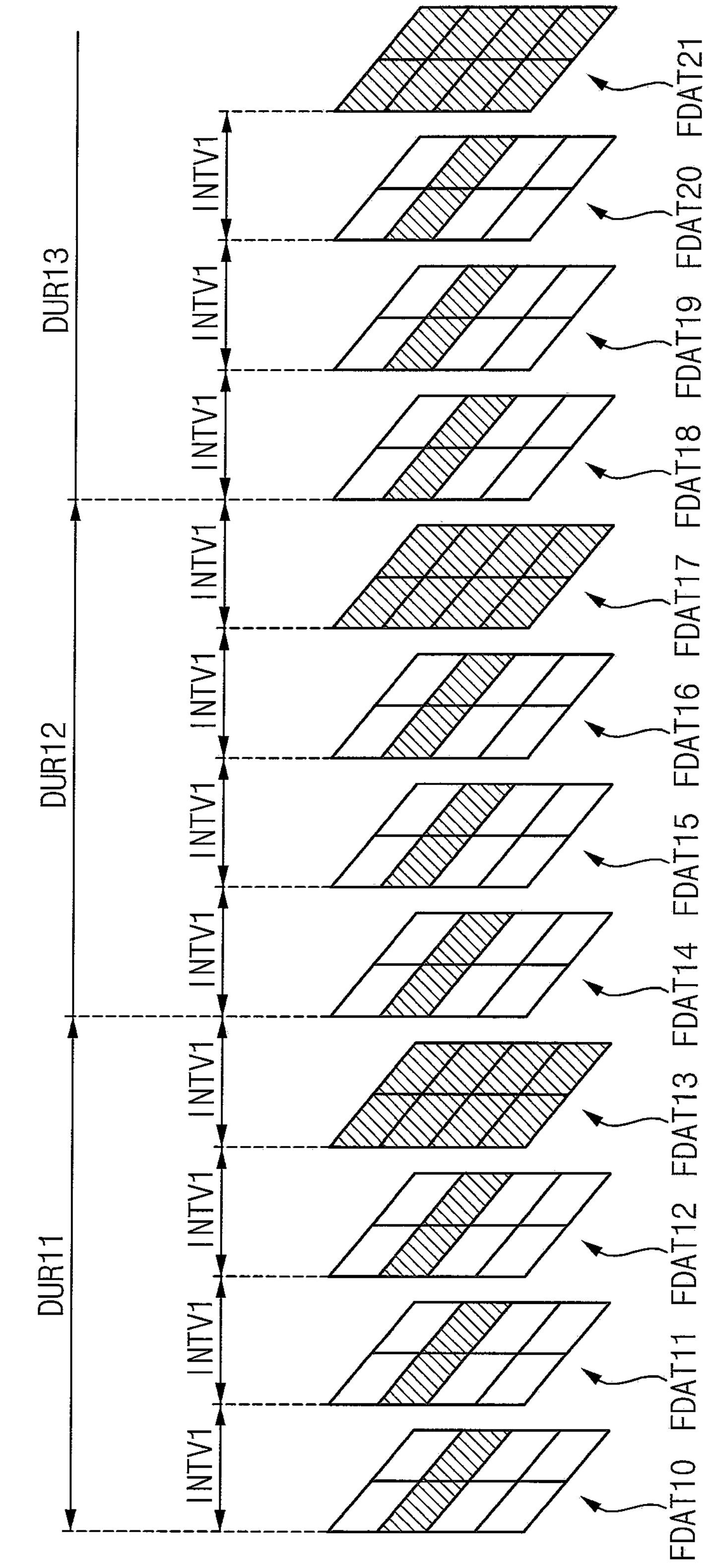
FIG. 13 is a diagram that illustrates a plurality of frame data sequentially received form the host processor in FIG. 1.

FIG. 13 is a diagram that illustrates a plurality of frame data sequentially received from the host processor in FIG. 1.

Referring to FIG. 13, a plurality of frame data FDAT10, FDAT11, FDAT12, FDAT13, FDAT14, FDAT15, FDAT16, FDAT17, FDAT18, FDAT19, FDAT20, and FDAT21 respectively corresponding to a plurality of frames may be transmitted from a host processor, e.g., 100 in FIG. 1, to a display driver integrated circuit, e.g., 200 in FIG. 1, during a plurality of time intervals DUR11, DUR12 and DUR13. Each of the plurality of frame data FDAT10 to FDAT21 may include a plurality of data slices divided based on a plurality of slice regions SL1 to SL8 described above with reference to FIG. 3.

In FIG. 13, among data slices included in the plurality of frame data FDAT10 to FDAT21, data slices of the present frame data, e.g., FDAT(n), having different values from corresponding data slices of the previous frame data, e.g., FDAT(n−1), may be represented by hatching. For example, data slices corresponding to the slice regions SL3 and SL4 in each of the plurality of frame data FDAT10 to FDAT21 may be updated per a first time interval INTV1, and data slices corresponding to the slice regions SL1, SL2 and SL5 to SL8 in each of the plurality of frame data FDAT10 to FDAT21 may be updated per a time interval, e.g., INTV1×4, corresponding to four times the first time interval INTV1. In this case, the first frame rate FRC may be calculated for each data slice corresponding to the slice regions SL1 to SL8. For example, for data slices corresponding to the slice regions SL3 and SL4, the first frame rate FRC may be a reciprocal of the first time interval INTV1, and for data slices corresponding to the slice regions SL1, SL2, and SL5 to SL8, the first frame rate FRC may be a reciprocal of four times the first time interval INTV1.

Figure 14:
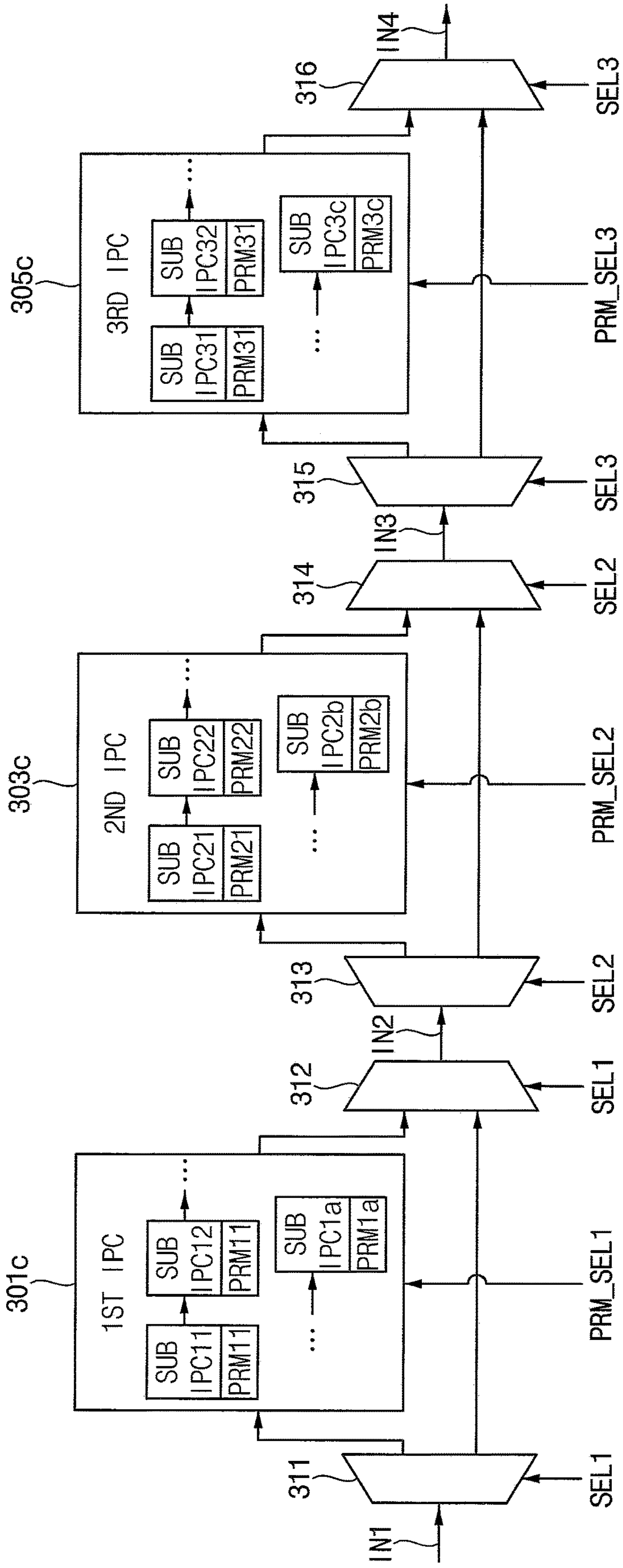
FIG. 14 is a block diagram that illustrates an example embodiment of the image processing unit in FIG. 1.

FIG. 14 is a block diagram illustrating an example embodiment of the image processing unit in FIG. 1.

Referring to FIGS. 6 and 14, first to third image processing circuits 301*c*, 303*c* and 305*c* further include the addition of parameter sets corresponding to a plurality of frame rates of a display panel, which may used to perform image processing operations as compared to the first to third image processing circuits 301, 303 and 305. Thus, duplicated descriptions will be omitted.

Each of the first to third image processing circuits 301*c*, 303*c* and 305*c* may further receive a parameter selection signal for setting the parameter sets. For example, the first image processing circuit 301*c* may receive a parameter selection signal PRM SEL1, the second image processing circuit 303*c* may receive a parameter selection signal PRM SEL2, and the third image processing circuit 305*c* may receive a parameter selection signal PRM SEL3.

FIG. 15 is a diagram that illustrates an example of parameter sets used by each of a plurality of sub-image processing circuits in FIG. 14 to perform image signal processing operations.

Referring to FIGS. 14 and 15, parameter sets PRM11, PRM12, PRM1*a*, PRM21, PRM22, PRM2*b*, PRM31, PRM32, PRM3*c* may be stored in the first to third image processing circuits 301*c*, 303*c*, and 305*c* in FIG. 14, and may correspond to a plurality of sub-image processing circuits SUBIPC11, SUBIPC12, SUBIPC1*a*, SUBIPC21, SUBIPC22, SUBIPC2*b*, SUBIPC31, SUBIPC32, SUBIPC3*c* included in the first to third image processing circuits 301*c*, 303*c*, and 305*c*, respectively.

Each of the parameter sets PRM11, PRM12, PRM1*a*, PRM21, PRM22, PRM2*b*, PRM31, PRM32, PRM3*c* may include parameters respectively corresponding to a plurality of frame rates FR1, FR2, and FR3. For example, parameter set PRM11 for an image signal processing operation of the sub-image processing circuit SUBIPC11 may include a parameter PRM11-1 corresponding to a frame rate FR1, include a parameter PRM11-2 corresponding to a frame rate FR2, and include a parameter PRM11-3 corresponding to a frame rate FR3. Other parameter sets PRM12, PRM1a, PRM21, PRM22, PRM2b, PRM31, PRM32, PRM3c may also include parameters respectively corresponding to a plurality of frame rates FR1, FR2, and FR3 and respectively corresponding to sub-image processing circuits SUBIPC12, SUBIPC1a, SUBIPC21, SUBIPC22, SUBIPC2b, SUBIPC31, SUBIPC32, SUBIPC3c in the same manner as the parameter set PRM11.

Referring back to FIG. 12, the frame rate calculation circuit 259 may be configured to calculate the first frame rate FRC based on a time interval from the first receiving time point and the second receiving time point, and the control signal generator 255 may be configured to output an image processing circuit control signal IPCTL used to control each of the plurality of image processing circuits 301, 303c, and 305c, based on the first frame rate FRC and the image processing circuit information IPCINF. Thus, based on the above configuration, each of the plurality of image processing circuits 301c, 303c and 305c may process data slices using an optimal parameter corresponding to a frame rate of a data slice to be processed based on the image processing circuit control signal IPCTL.

Figure 16:
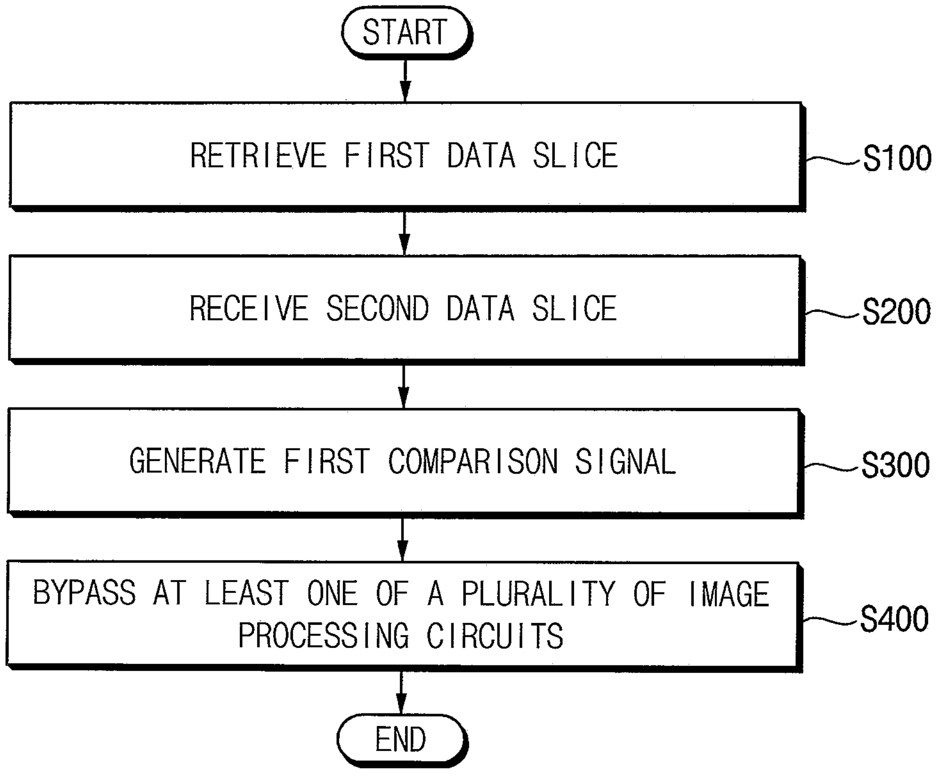
FIG. 16 is a flowchart illustrating a method of operating a display driver integrated circuit according to example embodiments.

FIG. 16 is a flowchart illustrating a method of operating a display driver integrated circuit according to example embodiments.

Referring to FIG. 16, a first data slice included in first frame data is retrieved from a frame buffer (S100).

In some embodiments, S100 may be performed by the image processing controller 250 in FIG. 1, and performed by the comparison circuit 251 in FIG. 2.

A second data slice included in second frame data may be received from a host processor (S200).

In some embodiments, S200 may be performed by the image processing controller 250 in FIG. 1, and performed by the comparison circuit 251 in FIG. 2.

In some embodiments, the first data slice may be the data slice DS(n−1)(p) described above with reference to FIG. 2, and the second data slice may be the data slice DS(n)(p) described above with reference to FIG. 2.

A comparison signal representing whether the first data slice is equal to the second data slice may be generated (S300).

In some embodiments, S300 may be performed by the image processing controller 250 in FIG. 1, and performed by the control signal generator 255 in FIG. 2.

In some embodiments, whether the first data slice is equal to the second data slice may be determined based on first values included in the first data slice and second values included in the second data slice.

In some embodiments, whether the first data slice is equal to the second data slice may be determined based on a first CRC parity value and a second CRC parity value. The first CRC parity value may be generated based on the first values, and the second CRC parity value may be generated based on the second values.

At least one of a plurality of image processing circuits may be bypassed based on the first comparison signal (S400).

In some embodiments, S400 may be performed by the image processing unit 290 in FIG. 1, and performed by the plurality of image processing circuits 301, 303, 305, 301a, 303a, 305a, 301b, 303b, and 303c described above with reference to FIGS. 6, 11 and 14.

Figure 17:
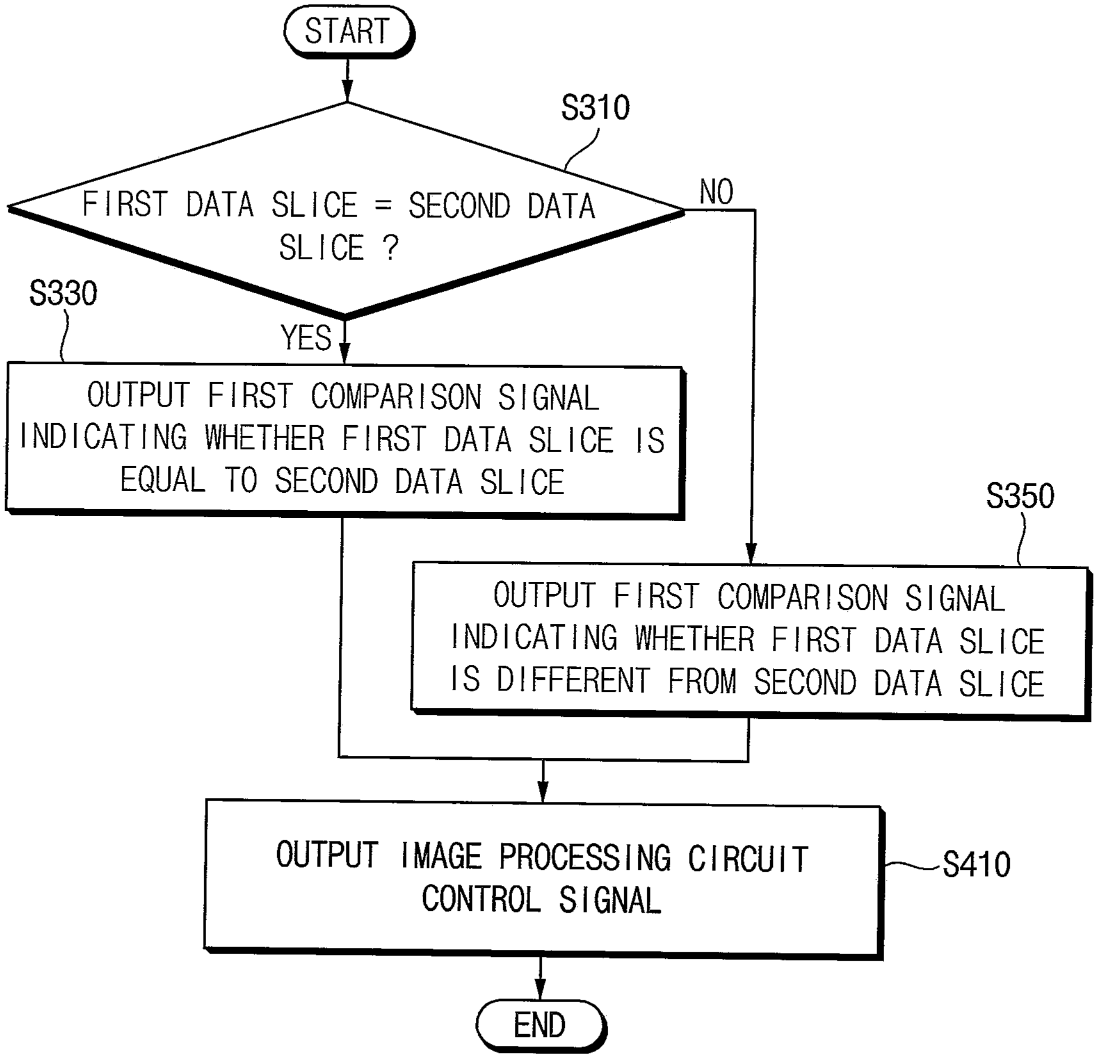
FIG. 17 is a flowchart illustrating an operation of generating a first comparison signal in FIG. 16.

FIG. 17 is a flowchart illustrating an example operation of generating a first comparison signal in FIG. 16.

Referring to FIGS. 16 and 17, it is determined whether the first data slice is equal to the second data slice (S310).

In response to the first data slice being equal to the second data slice (S310: YES), a comparison signal representing that the first data slice is equal to the second data slice may be output (S330).

In response to the first data slice being different from the second data slice (S310: NO), a comparison signal representing that the first slice is different from the second data slice may be output (S350).

An image processing circuit control signal may be output based on the comparison signal and image processing circuit information (S370).

In some embodiments, in response to the first data slice being equal to the second data slice, the first data slice stored in the frame buffer may be maintained, and in response to the first data slice being different from the second data slice, the first data slice stored in the frame buffer may be replaced with the second data slice.

Figure 18:
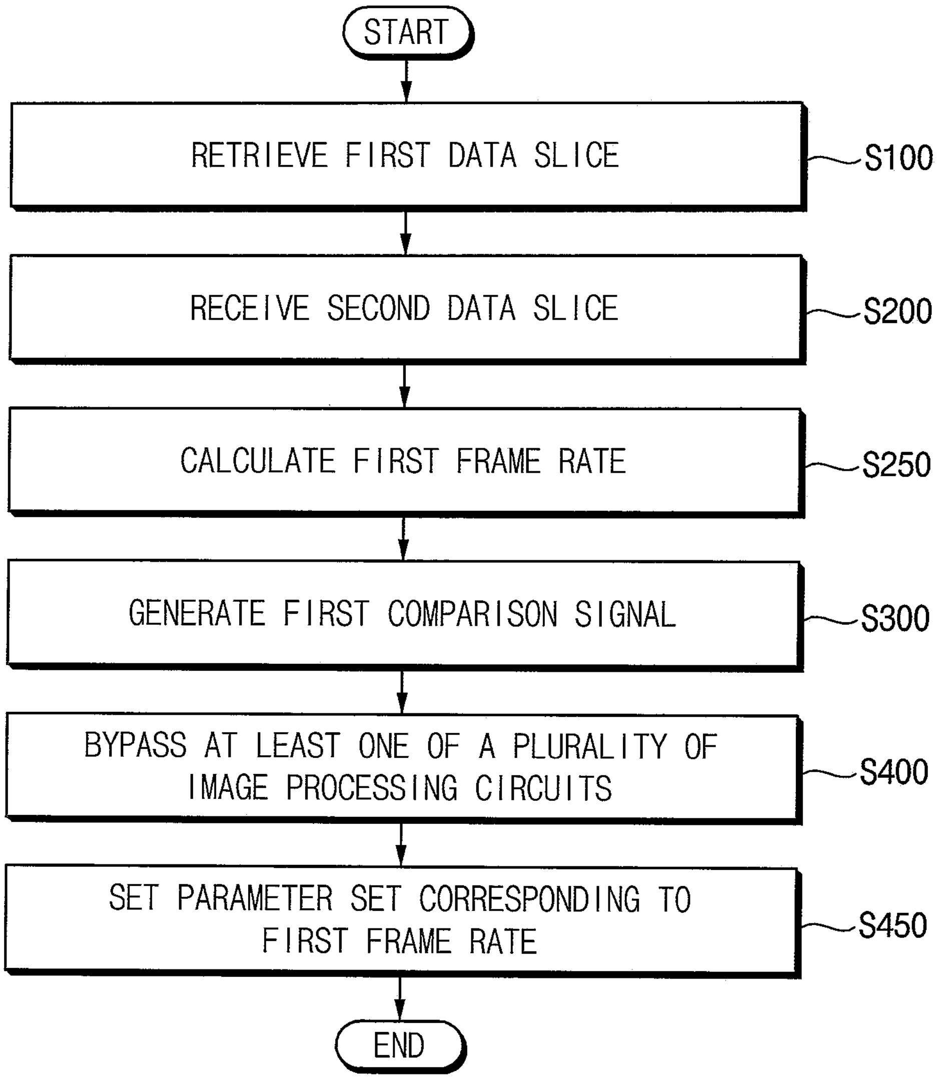
FIG. 18 is a flowchart illustrating a method of operating a display driver integrated circuit according to example embodiments.

FIG. 18 is a flowchart illustrating a method of operating a display driver integrated circuit according to example embodiments.

Referring to FIG. 18, a first data slice included in first frame data may be retrieved from a frame buffer (S100). A second data slice included in second frame data may be received from a host processor (S200).

A first frame rate may be calculated based on a time interval between a receiving time point of the first data slice and a receiving time point of the second data slice (S250).

In some embodiments, S250 may be performed by the frame rate calculation circuit 259 described above with reference to FIG. 12. The frame rate calculation circuit 259 may retrieve the first data slice from the frame buffer and receive the second data slice from the host processor.

In some embodiments, the frame rate calculation circuit 259 may determine a first receiving time point and a second receiving time point. The first receiving time point may represent a time point at which the first data slice is received from the host processor, and the second receiving time point may represent a time point at which the second data slice is received from the host processor. The frame rate calculation circuit 259 may calculate a first frame rate based on a time interval from the first receiving time point to the second receiving time point.

A first comparison signal representing whether the first data slice is equal to the second data slice nay be generated (S300). At least one of a plurality of image processing circuits may be bypassed based on the first comparison signal (S400). Parameter sets corresponding to the first frame rate may be set (S450).

In some embodiments, the parameter sets may correspond to a plurality of frame rates of a display panel and may be used by the first to third image processing circuits 301c, 303c, and 305c included in the image processing unit 290c described above with reference to FIG. 14 to perform image signal processing operations.

Figure 19:
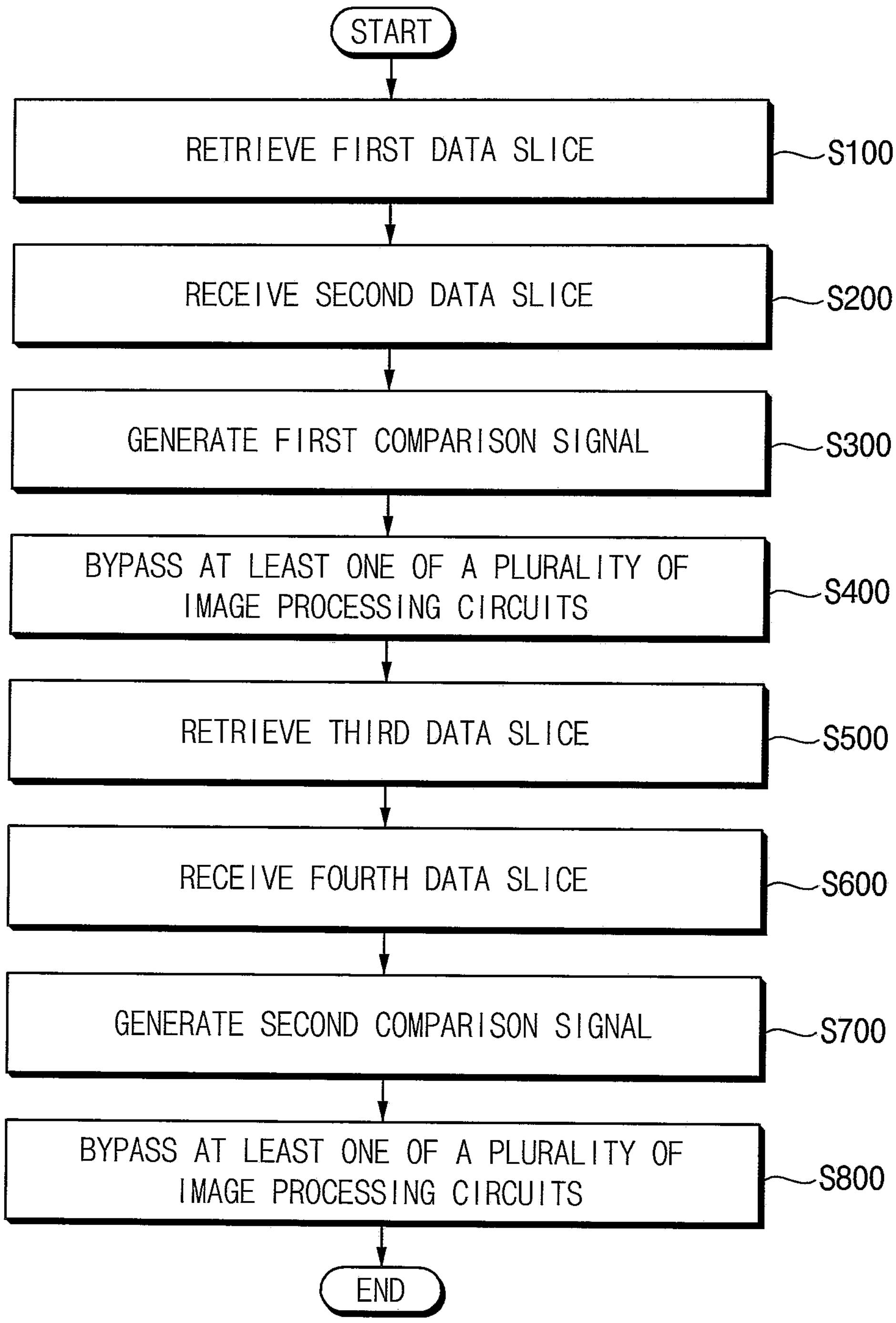
FIG. 19 is a flowchart illustrating a method of operating a display driver integrated circuit according to example embodiments.

FIG. 19 is a flowchart illustrating a method of operating a display driver integrated circuit according to example embodiments.

Referring to FIG. 19, a first data slice included in first frame data may be retrieved from a frame buffer (S100). A second data slice included in second frame data may be received from a host processor (S200).

In some embodiments, the first data slice may be the data slice DS(n−1)(p) described above with reference to FIG. 2, and the second data slice may be the data slice DS(n)(p) described above with reference to FIG. 2.

A first comparison signal representing whether the first data slice is equal to the second data slice may be generated (S300). At least one of a plurality of image processing circuits may be bypassed based on the first comparison signal (S400).

A third data slice included in the first frame data may be retrieved from the frame buffer (S500). A fourth data slice included in the second frame data may be received from the host processor (S600).

In some embodiments, the third data slice may be data slice DS(n−1)(p+1), and the fourth data slice may be data slice DS(n)(p+1).

A second comparison signal representing whether the third data slice is equal to the fourth data slice may be generated (S700). At least one of a plurality of image processing circuits may be bypassed based on the second comparison signal (S800).

Figure 20:
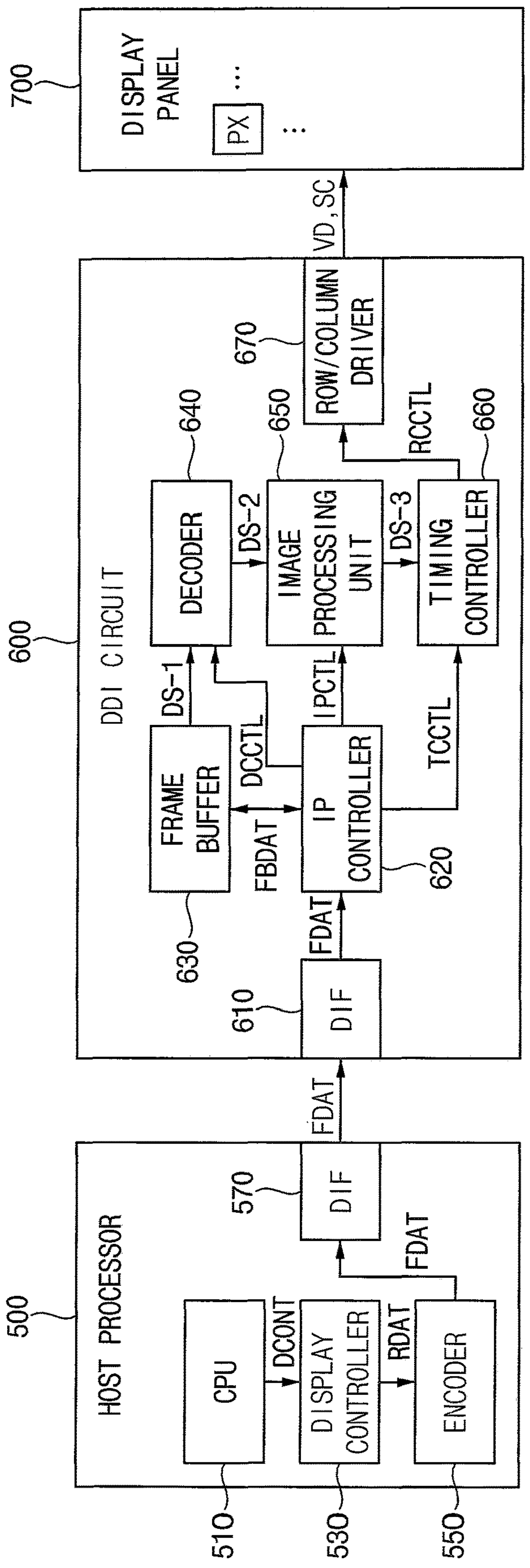
FIG. 20 is a block diagram illustrating a display system including a display driver integrated circuit according to example embodiments.

FIG. 20 is a block diagram illustrating a display system including a display driver integrated circuit according to example embodiments.

Referring to FIG. 20, a display device 10*a* may include a host processor 500, a display driver integrated circuit 600 and a display panel 700.

The host processor 500 may correspond to the host processor 100 described above with reference to FIG. 1, and include a central processing unit (CPU) 510, a display controller 530, an encoder 550, and a display interface 570.

The CPU 510 may be configured to control overall operations of the host processor 500 and be implemented as processor with various names, such as a microprocessor, an application processor (AP), or a combination thereof.

The display controller 530 may be configured to receive a control signal DCONT from the CPU 510 and may be configured to generate raw data RDAT displayed on the display panel 700 based on the control signal DCONT.

The host processor 500 may be configured to generate frame data FDAT based on the raw data RDAT, and may be configured to transmit the frame data FDAT to the display driver integrated circuit 600 through the display interface 570.

In some embodiments, the frame data FDAT may be data encoded by the encoder 550.

In some embodiments, the display interface 570 may be implemented based on one or more of various standards, such as a Mobile Industry Processor Interface (MIPI), a High Definition Multimedia Interface (HDMI), a Display Port (DP), a Low Power Display Port (LPDP), and an Advanced Low Power Display Port (ALPDP).

The host processor 500 may further include a plurality of memories for temporarily storing the raw data RDAT or the frame data FDAT, and the plurality of memories may include one or more volatile memories, such as a dynamic random access memory (DRAM), a static random access memory (SRAM), and the like, and nonvolatile memories, such as an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and the like. The plurality of memories may also include a solid state drive (SSD), an universal flash storage (UFS), a multi-media card (MMC), an embedded MMC (eMMC), a secure digital (SD) card, a micro SD card, a memory stick, a chip card, an universal serial bus (USB) card, a smart card, a compact flash (CF) card, and the like.

The host processor 500 may further include a plurality of function modules, and the plurality of function modules may include a communication module, e.g., a code division multiple access (CDMA) module, a long term evolution (LTE) module, a radio frequency (RF) module, an ultra-wideband (UWB) module, a wireless local area network (WLAN) module, a worldwide interoperability for microwave access (WIMAX) module, etc., for performing a communication function, a camera module for performing a camera function, an input/output module for a user interface, a microphone module for input/output of an audio signal, an audio module including a speaker module, and the like. In some embodiments, the plurality of function modules may further include a global positioning system (GPS) module, a gyroscope module, and the like.

The display driver integrated circuit 600 may correspond to the display driver integrated circuit 200 described above with reference to FIG. 1, and the display driver integrated circuit 600 may include a host interface 610, an image processing controller 620, a frame buffer 630, a decoder 640, an image processing unit 650, a timing controller 660 and a row/column driver 670.

The image processing controller 620 may correspond to the image processing controller 250 in FIG. 1, and the image processing unit 650 may correspond to the image processing unit 290 in FIG. 1.

The image processing controller 620 may be configured to generate a comparison signal representing whether a first data slice is equal to a second data slice. The first data slice may be included in first frame data stored in the frame buffer 630, and the second data slice may be included in second frame data received after the first frame data from the host processor 500. The second data slice may correspond to the first data slice.

The image processing controller 620 may be configured to bypass at least one of a plurality of image processing circuits included in the image processing unit 650 based on the comparison signal.

The decoder 640 may be implemented between the frame buffer 630 and the image processing unit 650, and the decoder 640 may be configured to perform a decoding on data slices retrieved from the frame buffer 630 to provide the decoded data slices to the image processing unit 650.

The image processing unit 650 may include the plurality of image processing circuits, and each of the plurality of image processing circuits may include a plurality of sub-image processing circuits. The image processing unit 650 may be configured to use the plurality of sub-image processing circuits to perform various image signal processing operations, such as a color coordinate conversion, an image quality improvement, a bad pixel compensation, a demosaic, a noise reduction, a lens shading correction, a gamma correction, an edge enhancement, and the like, on data slices.

The timing controller 660 may be configured to control overall operations of a display device including the display driver integrated circuit 600 and the display panel 700. The timing controller 660 may be configured to generate a display control signal associated with driving a display panel 700 based on data output from the plurality of image processing circuits. For example, the timing controller 660 may be configured to generate a control signal RCCTL for controlling the row/column driver 670 to output the control signal TCCTL to the row/column driver 670. The row/column driver 670 may be configured to generate a plurality of data voltages VD and a plurality of scan signals SC based on the control signal RCCTL. The row/column driver 670 may be configured to apply voltages corresponding to frame data displayed on the display panel 700 based on the plurality of data voltages VD, and the row/column driver 670 may include a digital-to-analog converter (DAC) that is configured to convert a digital data signal into a plurality of analog data voltages VD. The row/column driver 670 may be configured to drive a plurality of scan lines included in the display panel 700 based on the plurality of scan signals SC.

The display panel 700 may be driven, e.g., display a frame image, based on the frame data FDAT. The display panel 700 may be connected to the row/column driver 670 through the plurality of data lines and the plurality of scan lines. The plurality of data lines and the plurality of scan lines may extend in first and second directions crossing, e.g., orthogonal to, each other, respectively.

In some embodiments, the display panel 700 may be a display panel controlled by the display driver integrated circuit 600 according to example embodiments.

In some embodiments, the display panel 700 may be a self-luminous display panel that emits light without using a backlight unit. For example, the display panel 700 may be an organic light emitting display (OLED) panel including organic light emitting diodes as a light emitting device.

In some embodiments, each of a plurality of pixels PX included in the display panel 700 may have various configurations based on a driving scheme of the display panel 700. For example, the driving scheme may be divided into analog driving or digital driving according to a scheme of expressing grayscale. While the analog driving scheme produces grayscale using variable voltage levels corresponding to input data, the digital driving scheme produces grayscale using variable time duration in which the light emitting diode emits light. The analog driving scheme may be difficult to implement because it requires a driving integrated circuit (IC) that is complicated to manufacture if the display is large and has high resolution. The digital driving scheme, on the other hand, may accomplish the required high resolution through a simpler IC structure. An example of each of the plurality of pixels PX will be described with reference to FIG. 21.

In one embodiment, the timing controller 660 and the row/column driver 670 may be implemented as one IC. In another embodiment, the timing controller 660 and the row/column driver 670 may be implemented as two or more ICs. A driving module including at least the timing controller 660 and the row/column driver 670 may be referred to as a timing controller embedded data driver (TED).

Figure 21:
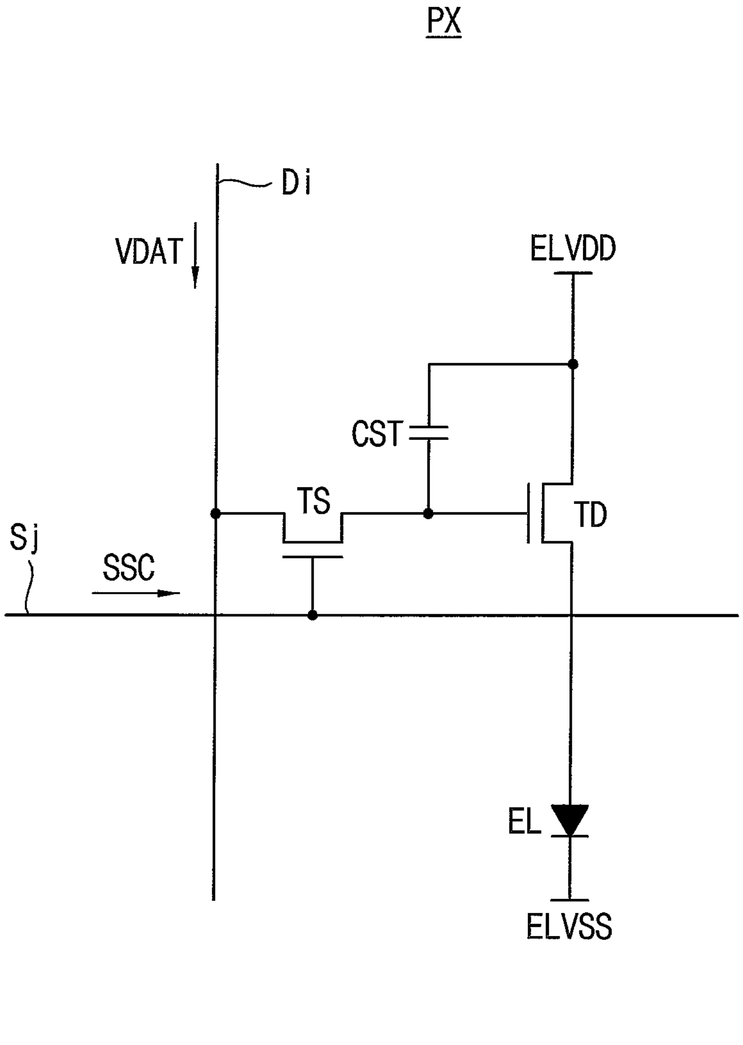
FIG. 21 is a circuit diagram illustrating an example of a pixel included in a display panel in FIG. 20.

FIG. 21 is a circuit diagram illustrating an example of a pixel included in a display panel in FIG. 20.

Referring to FIG. 21, each pixel PX may include a switching transistor TS, a storage capacitor CST, a driving transistor TD, and an organic light emitting diode EL.

The switching transistor TS may have a first electrode connected to a data line Di, a second electrode connected to the storage capacitor CST, and a gate electrode connected to a scan line Sj. The switching transistor TS may transfer a data voltage VDAT received from the row/column driver 670 to the storage capacitor CST.

The storage capacitor CST may have a first electrode connected to the first power supply voltage ELVDD and a second electrode connected to a gate electrode of the driving transistor TD. The storage capacitor CST may be configured to store the data voltage VDAT transferred through the switching transistor TS.

The driving transistor TD may have a first electrode connected to the first power supply voltage ELVDD, a second electrode connected to the organic light emitting diode EL, and the gate electrode connected to the storage capacitor CST. The driving transistor TD may be turned on or off based on the data voltage VDAT stored in the storage capacitor CST.

The organic light emitting diode EL may have an anode electrode connected to the driving transistor TD and a cathode electrode connected to the second power supply voltage ELVSS. The organic light emitting diode EL may emit light based on a current flowing from the first power supply voltage ELVDD to the second power supply voltage ELVSS while the driving transistor TD is turned on. The brightness of the pixel PX may increase as the current flowing through the organic light emitting diode EL increases.

Although FIG. 21 illustrates an organic light emitting diode pixel as an example of each pixel PX that may be included in the display panel 700, it will be understood that example embodiments are not limited to the organic light emitting diode pixel and example embodiments may be applied to any pixels of various types and configurations.

Figure 22:
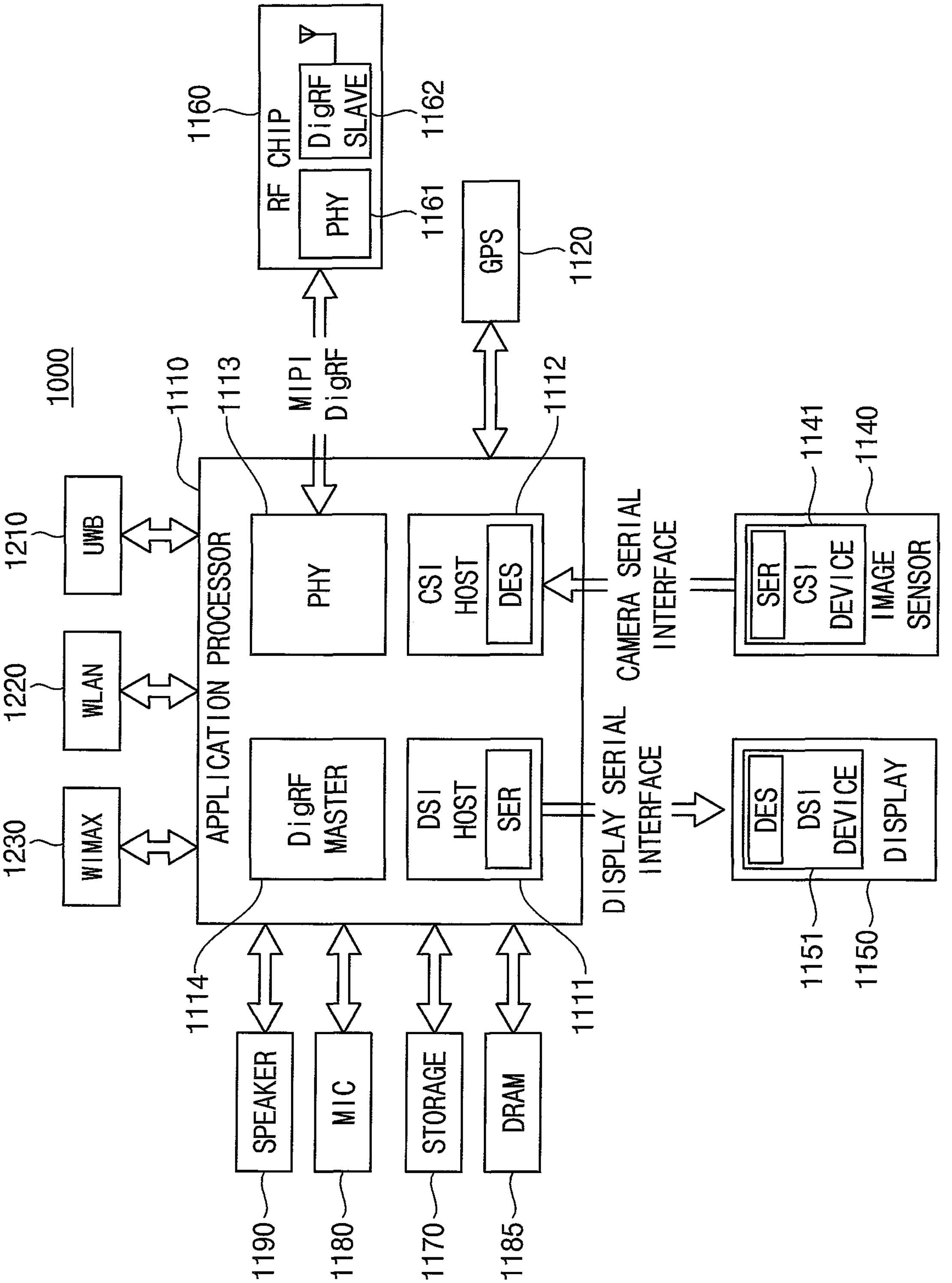
FIG. 22 is a block diagram illustrating an electronic system according to example embodiments.

FIG. 22 is a block diagram illustrating an electronic system according to example embodiments.

Referring to FIG. 22, an electronic system 1000 may be implemented as a data processing device that uses or supports a mobile industry processor interface (MIPI). The electronic system 1000 may include an application processor 1110, an image sensor 1140, a display device 1150, and the like. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultra-wideband (UWB) 1210, a wireless local area network (WLAN) 1220, a worldwide interoperability for microwave access (WIMAX) 1230, etc.

The application processor 1110 may be a controller or a processor that may be configured to control operations of the image sensor 1140 and the display device 1150.

The application processor 1110 may include a display serial interface (DSI) host 1111 that may be configured to perform a serial communication with a DSI device 1151 of the display device 1150, a camera serial interface (CSI) host 1112 that may be configured to perform a serial communication with a CSI device 1141 of the image sensor 1140, a physical layer (PHY) 1113 that may be configured to perform data communications with a PHY 1161 of the RF chip 1160 based on a MIPI DigRF, and a DigRF MASTER 1114 that may be configured to control the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

The application processor 1110 may be the host processor 100 in FIG. 1. The display device 1150 may include the display driver integrated circuit according to example embodiments, and operate based on the method of operating the display driver integrated circuit according to example embodiments.

As described above, the display driver integrated circuit according to example embodiments may be configured to control all or a portion of data slices provided to the image processing unit to bypass at least one of the plurality of image processing circuits. The display driver integrated circuit may efficiently reduce power consumption in the display driver integrated circuit by omitting image signal processing operations associated with the bypassed data slices. The display driver integrated circuit may be configured to receive a plurality of frame data from the host processor sequentially and may be configured to process each of the plurality of frame data in units of data slices inside the display driver integrated circuit. Thus, the display driver integrated circuit may efficiently reduce computational complexity required in a process of reducing power consumption.

The inventive concept may be applied to various electronic devices and systems that include the display devices and the display systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display driver integrated circuit comprising:

a frame buffer configured to sequentially store a plurality of frame data received from a host processor, each of the plurality of frame data including a plurality of data slices;

a plurality of image processing circuits configured to perform image signal processing operations, respectively, on ones of the plurality of data slices that are included in a respective one of the plurality of frame data and which are sequentially retrieved from the frame buffer; and an image processing controller configured to bypass at least one of the plurality of image processing circuits by applying a bypass control signal to the plurality of image processing circuits based on a first plurality of data slices included in a first one of the plurality of frame data and a second plurality of data slices included in a second one of the plurality of frame data, wherein the first one of the plurality of frame data is stored in the frame buffer and the second one of the plurality of frame data is received after the first one of the plurality of frame data from the host processor, and wherein the second one of the plurality of data slices corresponds to the first one of the plurality of data slices, wherein the image processing controller includes:

a comparison circuit configured to generate a comparison signal indicating whether the first one of the first plurality of data slices is equal to the second one of the second plurality of data slices based on first values included in the first one of the plurality of data slices and second values included in the second one of the plurality of data slices; and a control signal generator configured to, based on the comparison signal and image processing circuit information from the plurality of image processing circuits, generate an image processing circuit control signal including the bypass control signal, the image processing circuit control signal being used to control each of the plurality of image processing circuits, the image processing circuit information representing target image types of the image signal processing operations performed by the plurality of image processing circuits.

2. The display driver integrated circuit of claim 1, wherein the comparison circuit is further configured to, in response to the first values being equal to the second values, determine that the first one of the plurality of data slices is equal to the second one of the plurality of data slices.

3. The display driver integrated circuit of claim 1, wherein the comparison circuit is configured to, in response to a first cyclic redundancy check (CRC) parity value associated with the first one of the plurality of data slices being equal to a second CRC parity value associated with the second one of the plurality of data slices, determine that the first one of the plurality of data slices is equal to the second one of the plurality of data slices, the first CRC parity value is obtained as a result of performing a CRC operation on the first values and the second CRC parity value is obtained as a result of performing the CRC operation on the second values.

4. The display driver integrated circuit of claim 1, wherein the plurality of image processing circuits includes:

a first image processing circuit configured to perform a first image signal processing operation on a moving image;

a second image processing circuit configured to perform a second image signal processing operation on the moving image and a still image; and a third image processing circuit configured to perform a third image signal processing operation on the still image.

5. The display driver integrated circuit of claim 4, wherein, in response to the first one of the plurality of data slices being equal to the second one of the plurality data slices, the first one of the plurality of data slices is output without performing the first image signal processing operation.

6. The display driver integrated circuit of claim 5, wherein the second image processing circuit is further configured to, regardless of whether the first one of the plurality of data slices is equal to the second one of the plurality of data slices, perform the second image signal processing operation on the first one of the plurality of data slices.

7. The display driver integrated circuit of claim 6, wherein, in response to the first one of the plurality of data slices being different from the second one of the plurality of data slices, the first one of the plurality of data slices is output without performing the third image signal processing operation.

8. The display driver integrated circuit of claim 5, wherein the image processing controller is further configured to:

in response to the first one of the plurality of data slices being equal to the second one of the plurality of data slices, disable the first image processing circuit while the first one of the plurality of data slices is output without performing the first image signal processing operation; and in response to the first one of the plurality of data slices being different from the second one of the plurality of data slices, disable the third image processing circuit while the first one of the plurality of data slices is output without performing the third image signal processing operation.

9. The display driver integrated circuit of claim 4, wherein the image processing controller further includes:

a frame rate calculation circuit configured to calculate a first frame rate based on a time interval from a first receiving time point to a second receiving time point, the first receiving time point representing a time point at which the first one of the plurality of data slices is received, the second receiving time point representing a time point at which the second one of the plurality of data slices is received.

10. The display driver integrated circuit of claim 9, wherein:

each of the plurality of image processing circuits includes a plurality of sub-image processing circuits;

each of the plurality of sub-image processing circuits includes parameter sets corresponding to a plurality of frame rates of a display panel and configured to perform the image signal processing operation corresponding to the respective one of the plurality of image processing circuits; and the image processing controller is further configured to control each of the plurality of sub-image processing circuits to set a parameter set corresponding to the first frame rate.

11. The display driver integrated circuit of claim 1, wherein:

the frame data is encoded data; and each of the plurality of data slices is obtained by dividing the frame data by a predetermined size.

12. The display driver integrated circuit of claim 11, wherein a size of each of the plurality of data slices is greater than or equal to a minimum size based on a predetermined standard.

13. The display driver integrated circuit of claim 11, further comprising:

a decoder configured to decode the ones of the plurality of data slices sequentially retrieved from the frame buffer;

a timing controller configured to generate a display control signal associated with driving a display panel based on data output from the plurality of image processing circuits; and a row/column driver configured to generate a plurality of data voltages and a plurality of scan signals based on the display control signal.

14. A method of operating a display driver integrated circuit, the method comprising:

retrieving a first data slice included in first frame data from a frame buffer;

receiving a second data slice included in second frame data from a host processor;

generating a first comparison signal representing whether the first data slice is equal to the second data slice; and bypassing at least one of a plurality of image processing circuits based on the first comparison signal, wherein generating the first comparison signal includes:

outputting the first comparison signal based on first values included in the first data slice and second values included in the second data slice, and wherein generating the first comparison signal further includes:

based on the comparison signal and image processing circuit information, outputting an image processing circuit control signal used to control each of the plurality of image processing circuits, the image processing circuit information representing target image types of the image signal processing operations performed by the plurality of image processing circuits.

15. The method of claim 14, further comprising:

retrieving a third data slice included in the first frame data from the frame buffer;

receiving a fourth data slice included in the second frame data from the host processor;

generating a second comparison signal representing whether the third data slice is equal to the fourth data slice; and bypassing at least one of the plurality of image processing circuits based on the second comparison signal.

16. The method of claim 14, further comprising:

calculating a first frame rate based on a time interval from a first receiving time point and a second receiving time point, the first receiving time point representing a time point at which the first data slice is received, the second receiving time point representing a time point at which the second data slice is received.

17. The method of claim 16, further comprising:

setting, by a plurality of sub-image processing circuits included in each of the plurality of image processing circuits, a parameter set corresponding to the first frame rate.

18. A display driver integrated circuit comprising:

a frame buffer configured to sequentially store a plurality of frame data received from a host processor, each of the plurality of frame data including a plurality of data slices;

a plurality of image processing circuits configured to perform image signal processing operations, respectively, on ones of the plurality of data slices which are retrieved from the frame buffer sequentially and included in one frame data; and an image processing controller configured to generate a comparison signal representing whether a first one of the plurality of data slices is equal to a second one of the plurality of data slices, and configured to bypass at least one of the plurality of image processing circuits based on the comparison signal, the first one of the plurality of data slices being included in first frame data stored in the frame buffer, the second one of the plurality of data slices being included in second frame data received after the first frame data from the host processor, the second one of the plurality of data slices corresponding to the first one of the plurality of data slices, wherein the image processing controller includes:

a comparison circuit configured to output the comparison signal based on first values included in the first one of the plurality of data slices and second values included in the second one of the plurality of data slices; and a control signal generator configured to, based on the comparison signal and image processing circuit information, output an image processing circuit control signal used to control each of the plurality of image processing circuits, the image processing circuit information representing target image types of the image signal processing operations performed by the plurality of image processing circuits, and wherein the plurality of image processing circuits includes:

a first image processing circuit configured to perform a first image signal processing operation on a moving image;

a second image processing circuit configured to perform a second image signal processing operation on the moving image and a still image; and a third image processing circuit configured to perform a third image signal processing operation on the still image.

* * * * *